United States Patent
Mizusawa

(10) Patent No.: US 9,290,218 B2
(45) Date of Patent: Mar. 22, 2016

(54) CRAWLER CORE FOR MEMBER AND RUBBER CRAWLER

(75) Inventor: Takashi Mizusawa, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 500 days.

(21) Appl. No.: 13/642,283

(22) PCT Filed: Apr. 21, 2011

(86) PCT No.: PCT/JP2011/059853
§ 371 (c)(1),
(2), (4) Date: Oct. 19, 2012

(87) PCT Pub. No.: WO2011/132746
PCT Pub. Date: Oct. 27, 2011

(65) Prior Publication Data
US 2013/0033100 A1 Feb. 7, 2013

(30) Foreign Application Priority Data

Apr. 21, 2010 (JP) ................................. 2010-098304
Apr. 21, 2010 (JP) ................................. 2010-098305

(51) Int. Cl.
*B62D 55/24* (2006.01)

(52) U.S. Cl.
CPC .................................. *B62D 55/244* (2013.01)

(58) Field of Classification Search
CPC ..... B62D 55/24; B62D 55/244; B62D 55/253
USPC ......... 305/157, 159, 167, 170, 171, 172, 174, 305/176, 177
See application file for complete search history.

(56) References Cited

U.S. PATENT DOCUMENTS

| 5,522,655 A * | 6/1996 | Katoh ........................... 305/174 |
| 2006/0279138 A1* | 12/2006 | Kato et al. .................... 305/177 |
| 2010/0096916 A1 | 4/2010 | Kato et al. |

FOREIGN PATENT DOCUMENTS

| EP | 2 154 053 A1 | 2/2010 |
| JP | 05058357 A * | 3/1993 |

(Continued)

OTHER PUBLICATIONS

International Search Report for PCT/JP2011/059853 dated Jul. 12, 2011.

(Continued)

*Primary Examiner* — Kip T Kotter
(74) *Attorney, Agent, or Firm* — Sughrue Mion, PLLC

(57) ABSTRACT

Providing a crawler core member that can be coupled in a simple operation without employing dedicated coupling components, and that can suppress deformation due to input from a road surface.
Coupling can be achieved by a simple operation without employing dedicated coupling components, and deformation due to input from a road surface can be suppressed in a crawler core member 20 that configures an endless crawler belt 13 when plural of the core members are disposed at uniform intervals along a peripheral direction S and the peripheral direction adjacent core members 20 are coupled together. The core member 20 includes a pin portion 22 extending in the width direction, a hooking groove 34 integrally formed to the pin portion 22 and hooking onto the pin portion 22 of an adjacent core member 20, and a pair of wing portions 30 integrally formed to the pin portion 22 and respectively disposed at both width direction sides of the pin portion 22, extending towards the width direction outsides.

12 Claims, 20 Drawing Sheets

(56) References Cited

FOREIGN PATENT DOCUMENTS

| JP | 10-67349 A | 3/1998 |
| JP | 2004-1595 A | 1/2004 |
| JP | 2007-50771 A | 3/2007 |
| JP | 2010-215063 A | 9/2010 |
| WO | 2008/149916 A1 | 12/2008 |

OTHER PUBLICATIONS

Chinese Office Action, dated Jun. 16, 2014, issued in corresponding Chinese Patent Application No. 201180020061.9.

\* cited by examiner

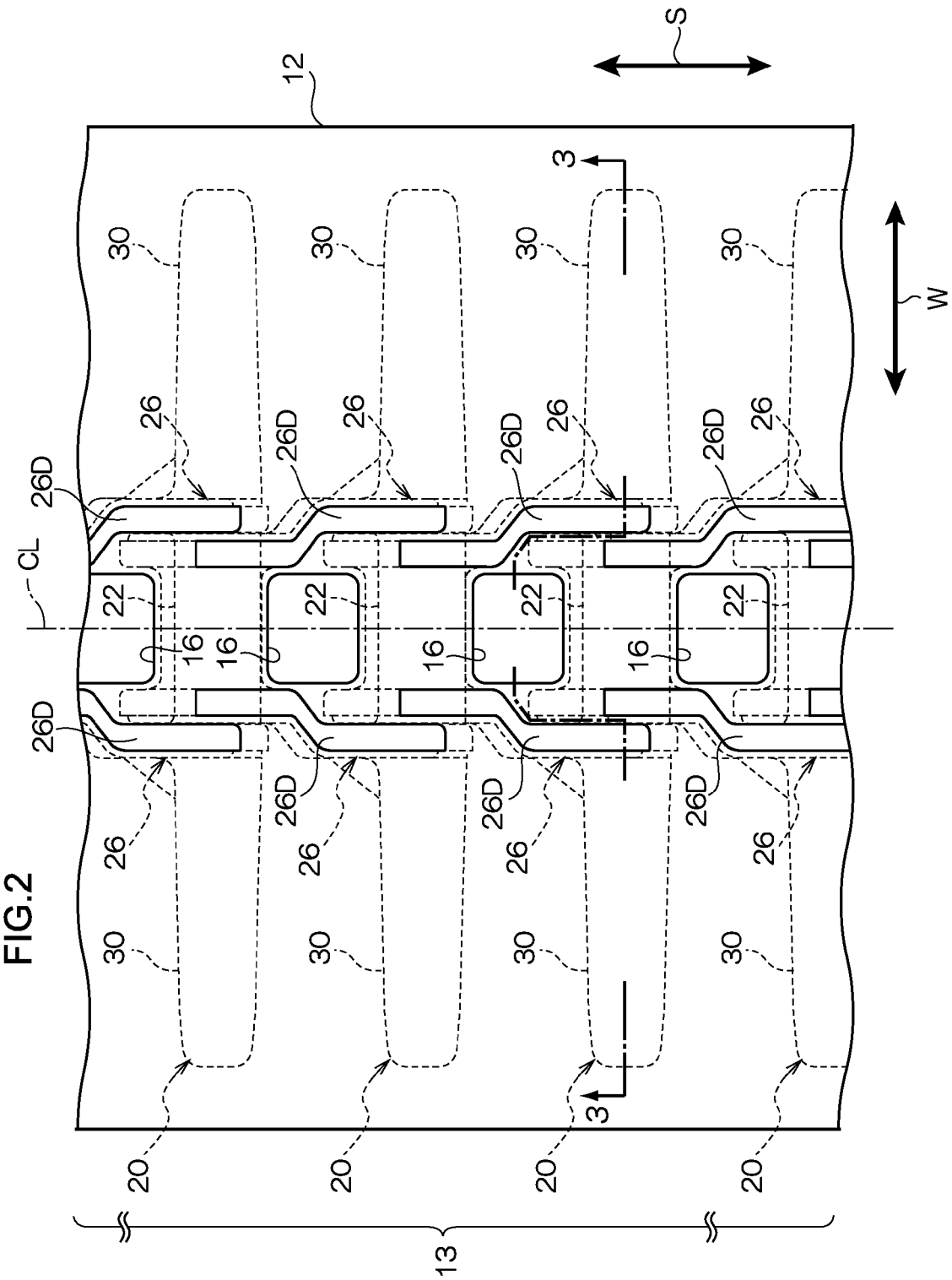

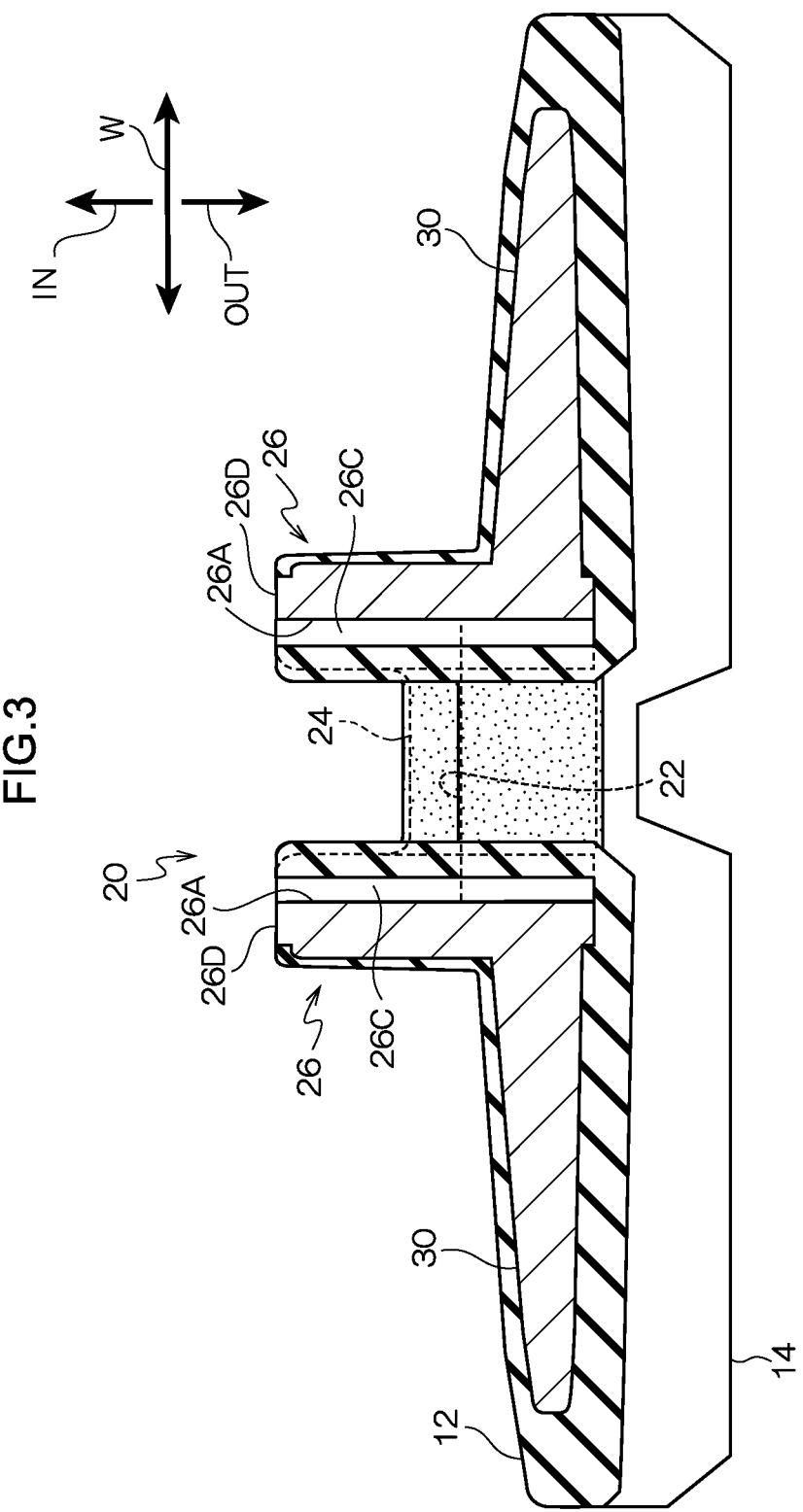

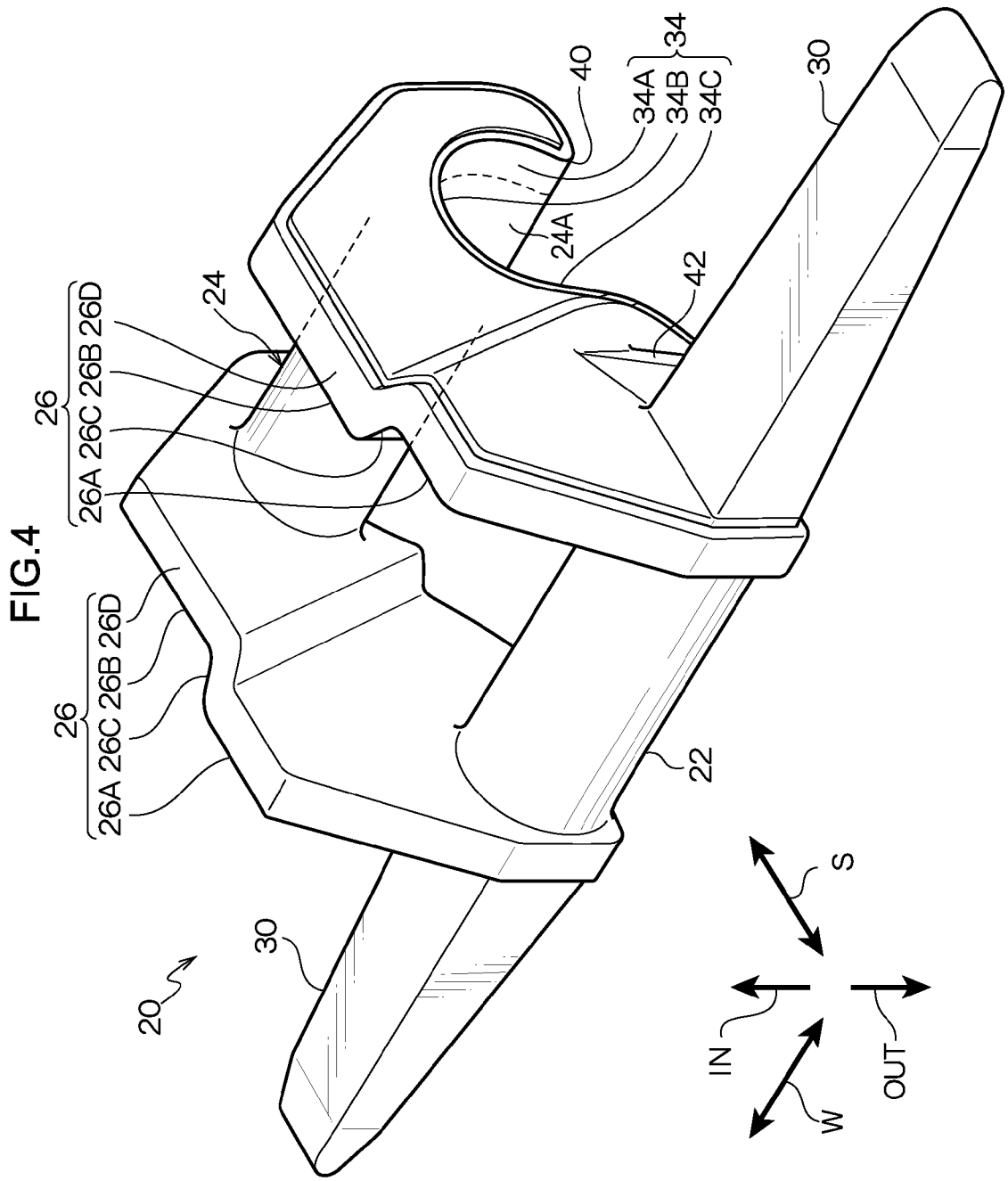

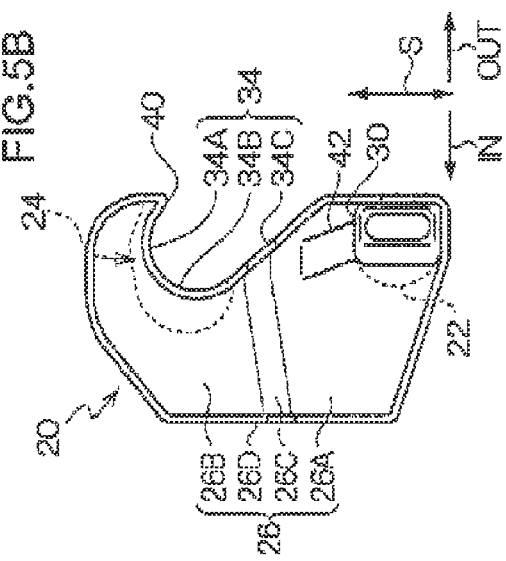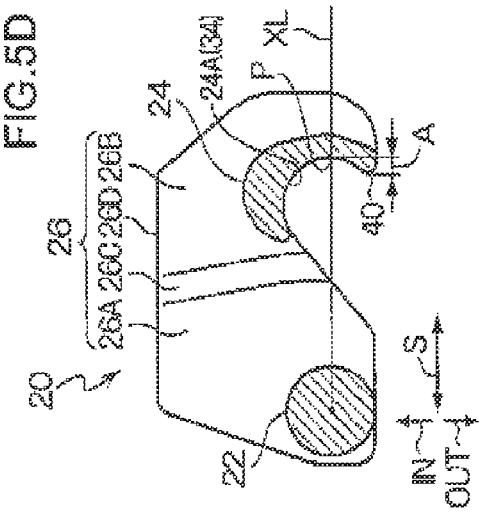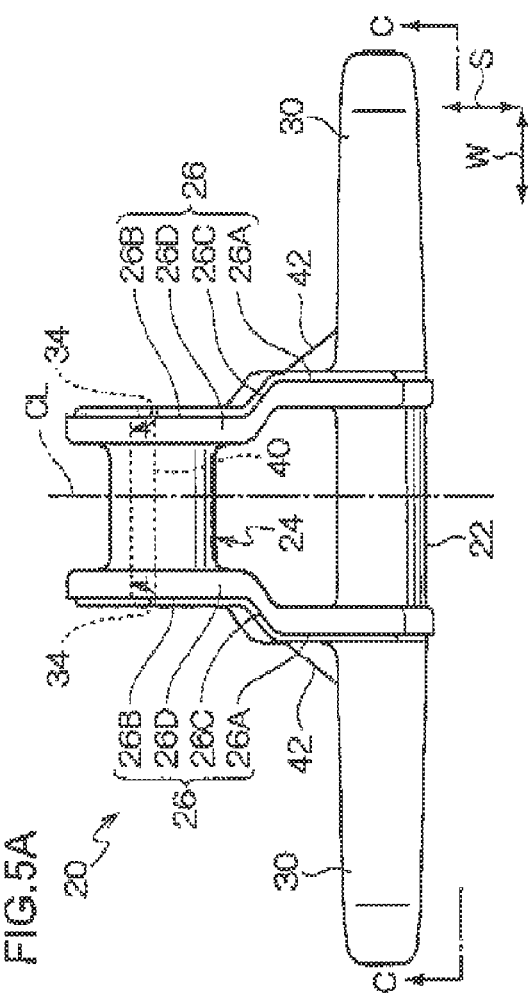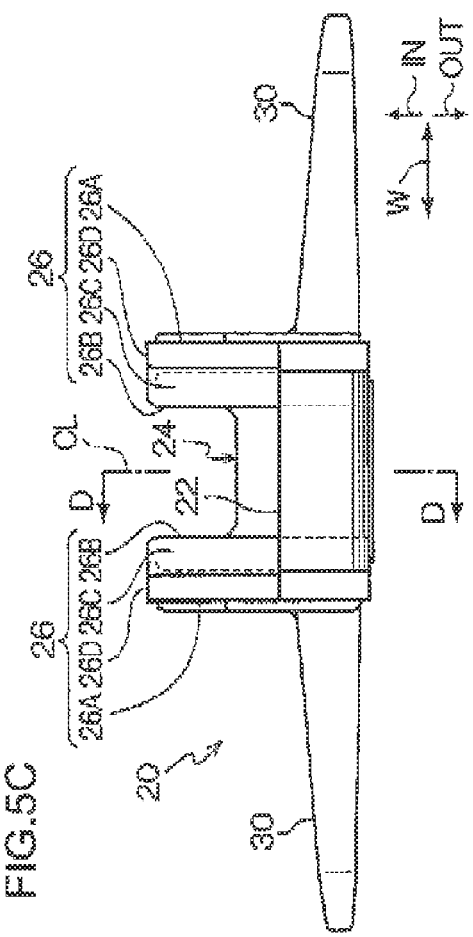

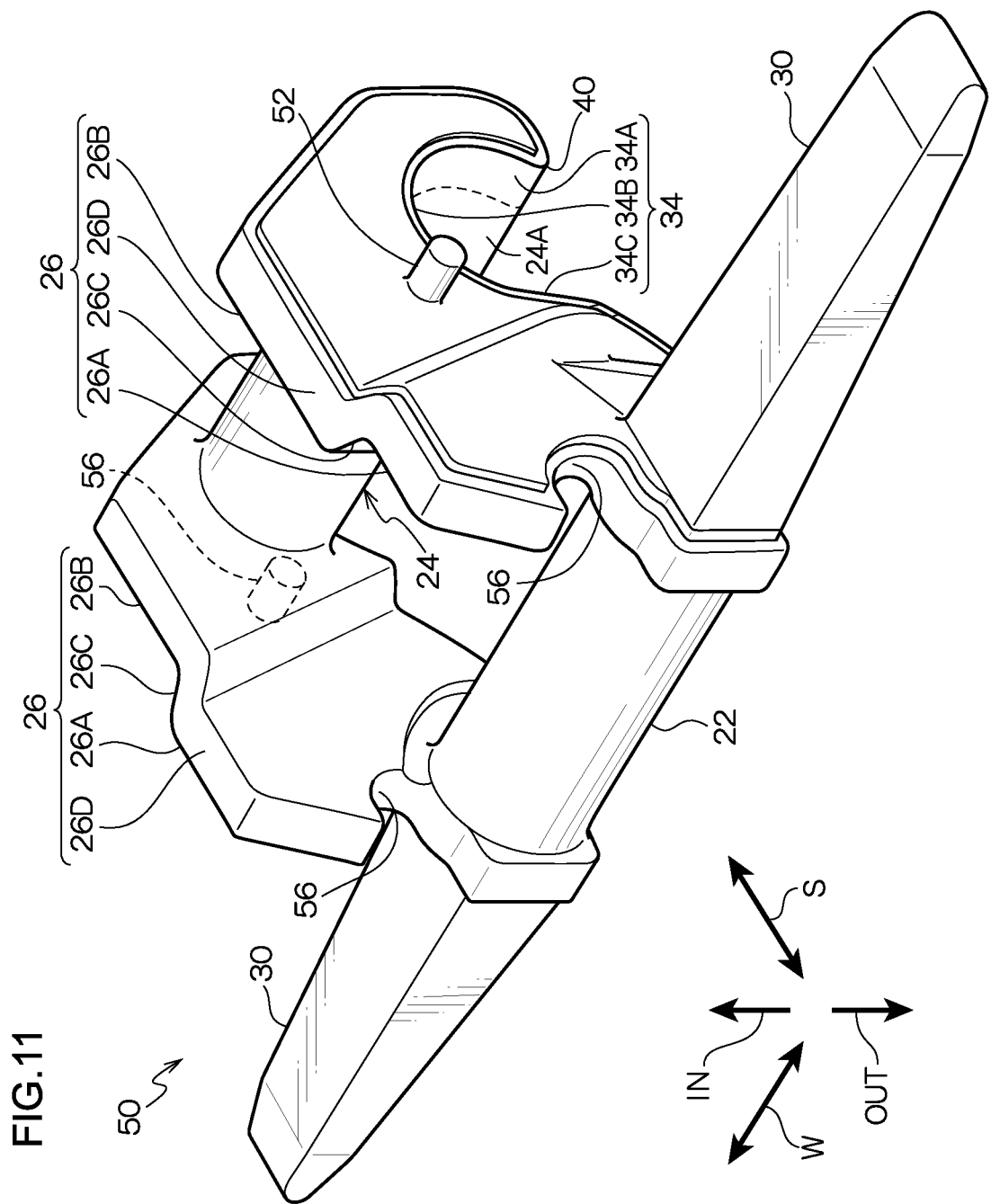

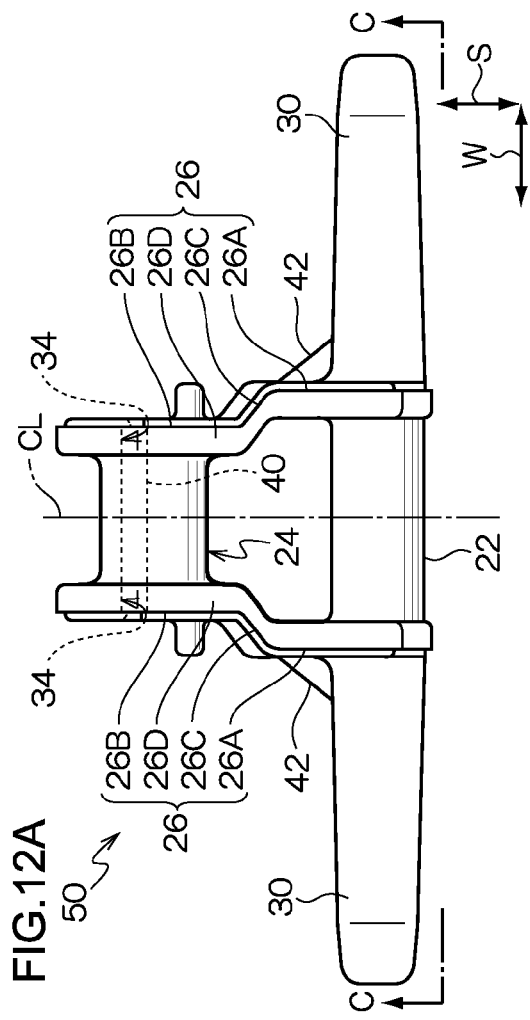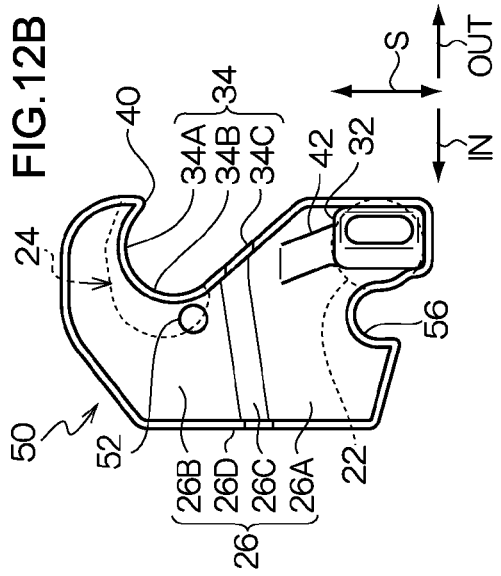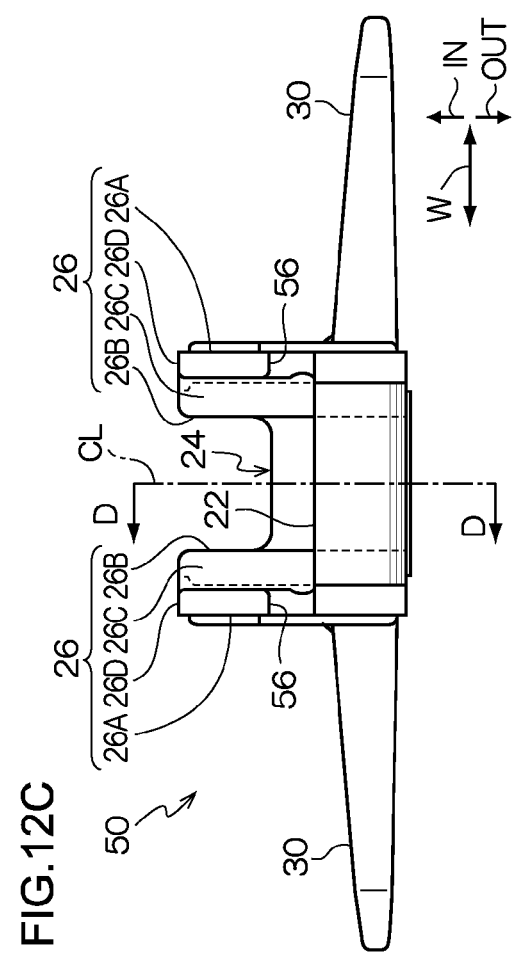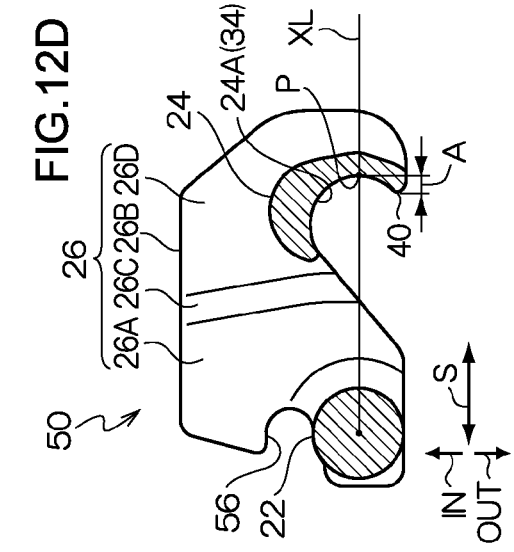

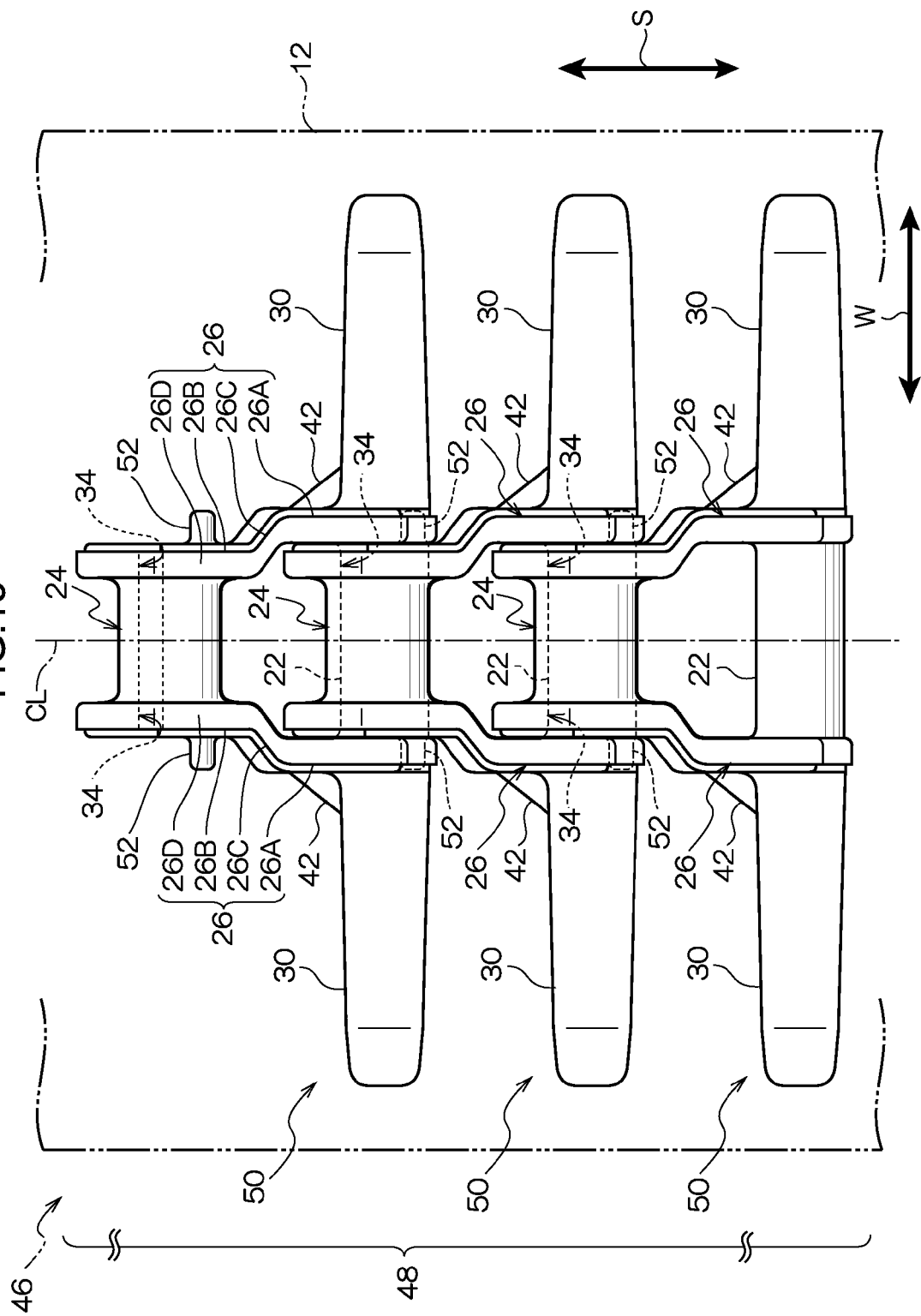

FIG.14
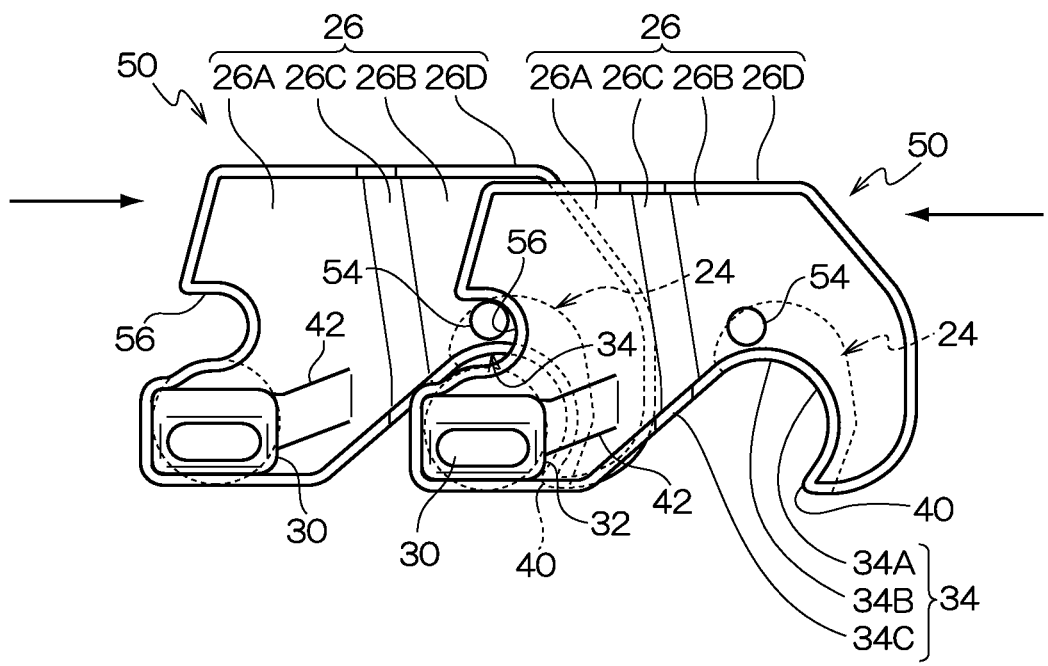
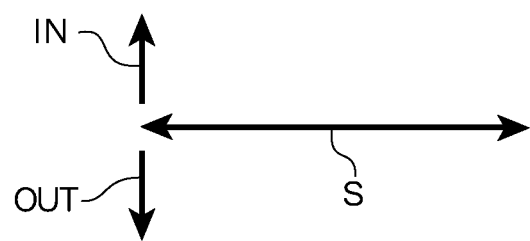

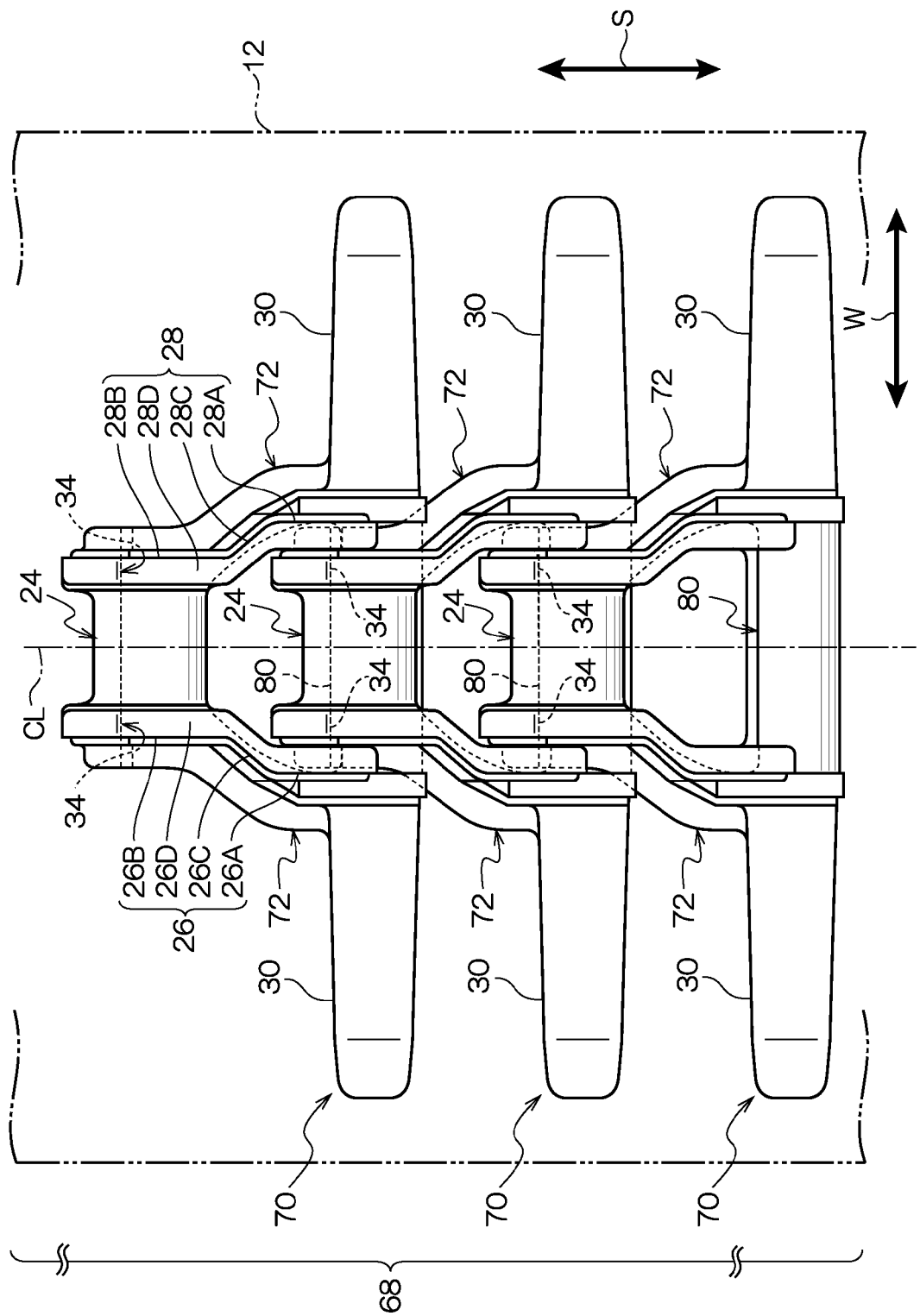

FIG.18
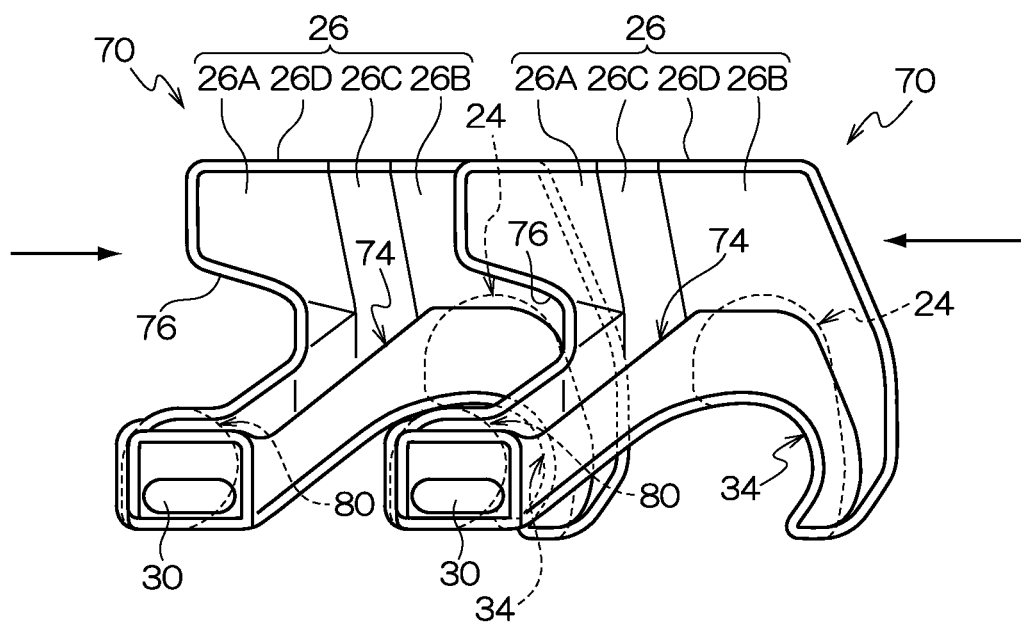
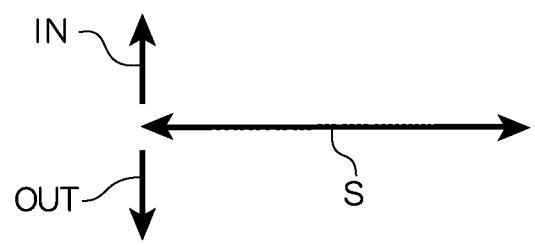

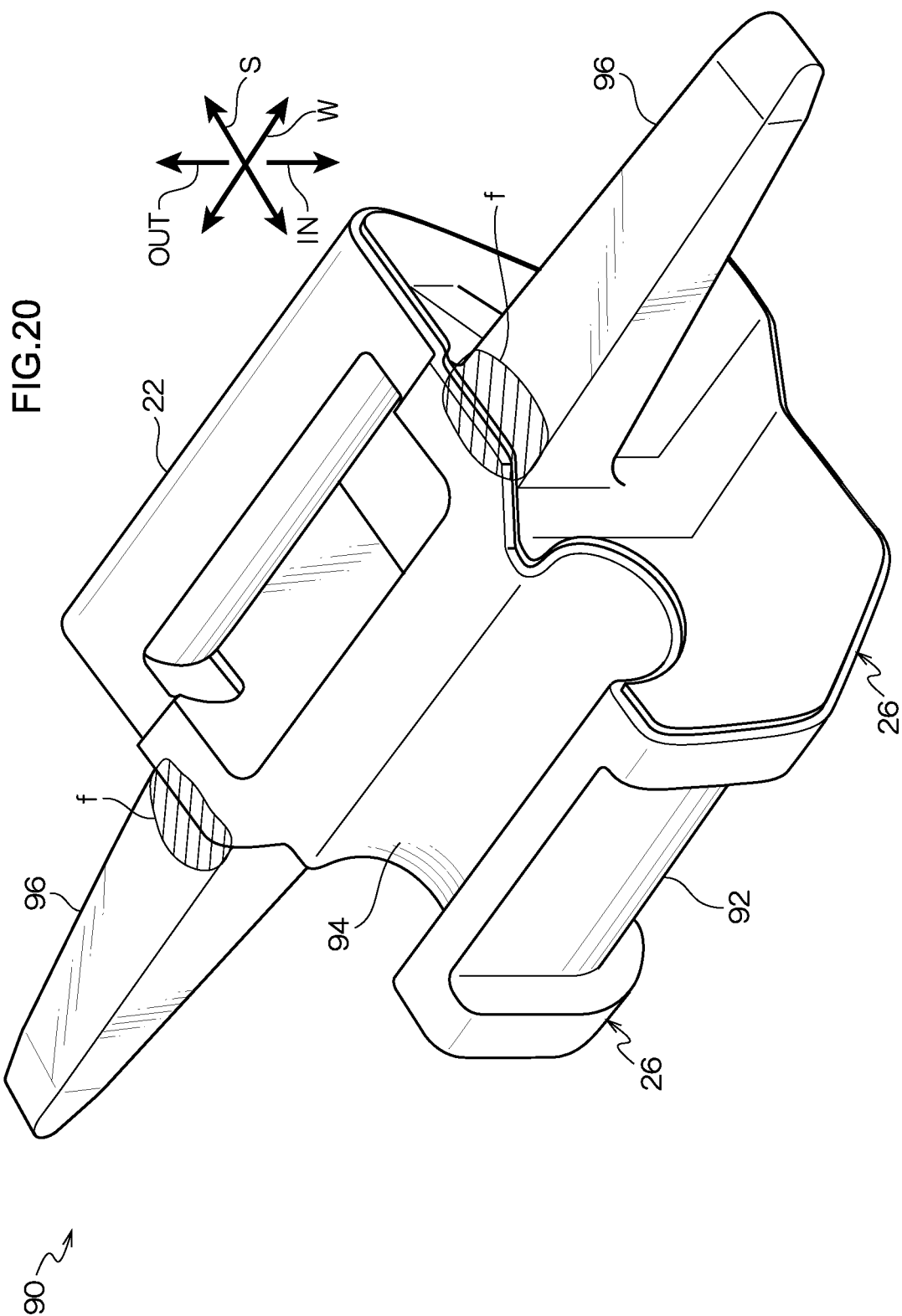

CRAWLER CORE FOR MEMBER AND RUBBER CRAWLER

CROSS REFERENCE TO RELATED APPLICATIONS

This application is a National Stage of International Application No. PCT/JP2011/059853 filed Apr. 21, 2011, claiming priority based on Japanese Patent Application Nos. 2010-098304 filed Apr. 21, 2010 and 2010-098305 filed Apr. 21, 2010, the contents of all of which are incorporated herein by reference in their entirety.

TECHNICAL FIELD

The present invention relates to a crawler core member and a rubber crawler.

BACKGROUND ART

In rubber crawlers, technology exists wherein adjacent core members are coupled together using coupling members such as coupling rings in order to retain tension between core members (for example see Patent Document 1 to Patent Document 3).

Patent Document 1 discloses a rubber crawler wherein closed opening portions are formed in wing portions of a core member and adjacent core members are coupled together by hooking coupling bodies into the closed opening portions of adjacent core members.

Patent Document 2 discloses a link type rubber crawler employing an integral link type core member wherein a core member portion is integrally formed with a link portion. In this link type rubber crawler, adjacent integral link type core members are coupled together by inserting coupling pins into the link portions of adjacent integral link type core members.

Patent Document 3 discloses a link type crawler wherein bulging portions are formed to wing portions of a core member, the bulging portions of adjacent core members overlap, and adjacent core members are coupled together by inserting rod members into circular void regions between the bulging portions.

Patent Document 1: Japanese Patent Application Laid-Open (JP-A) No. 2004-001595
Patent Document 2: JP-A No. 10-67349
Patent Document 3: JP-A No. 2007-50771

DISCLOSURE OF INVENTION

Technical Problem

An object of the present invention is to provide a crawler core member that can be coupled together in a simple operation without employing designated coupling components, and that can suppress deformation due to input from a road surface, and a rubber crawler employing these core members.

Solution to Problem

A crawler core member of a first aspect of the present invention is a crawler core member that configures an endless crawler belt when plural of the core members are disposed at uniform intervals along a peripheral direction and are coupled together with the peripheral direction adjacent core members, the core member including: an engagement shaft portion extending in the crawler belt width direction; an engagement portion integrally formed to the engagement shaft portion and engaging with the engagement shaft portion of an adjacent of the core members; and a pair of wing portions integrally formed to the engagement shaft portion and respectively disposed at both width direction sides of the engagement shaft portion, extending towards the width direction outsides, wherein the adjacent core members are coupled together by the engagement shaft portion of the adjacent core member engaging with the engagement portion of the core member.

In the crawler core member of the first aspect, adjacent core members are coupled together by the engagement shaft portion of the adjacent core member engaging with the engagement portion of the core member. Namely, adjacent core members can be coupled together without employing dedicated coupling components. Moreover, a coupling together operation of adjacent core members can be performed by the simple operation of engaging the engagement shaft portion of the adjacent core member with the engagement portion of the core member.

In the crawler core member of the first aspect, deformation of the core member can be suppressed due to the provision of the pair of wing portions extending towards the width direction outsides in comparison to, for example, a core member not provided with the pair of wing portions, since when employed in a rubber crawler input (load) from the road surface is dispersed in the pair of wing portions.

There is a tendency for stress to be concentrated at the base portions of wing portions that receive input from the road surface. In the crawler core member of the first aspect, the pair of wing portions are accordingly integrally formed to the engagement shaft portion and are respectively disposed at both width direction sides of the engagement shaft portion. Such a configuration alleviates stress concentration at the base portions of the wing portions and suppresses deformation of the wing portions, since the input from the road surface received by the wing portions is dispersed to the engagement shaft portion that is integrally formed with the wing portions.

However, for example in a core member wherein a pair of wing portions are respectively disposed between the engagement shaft portion and the engagement portion, the input received from the road surface by the wing portions is not adequately dispersed to the engagement shaft portion in comparison to the crawler core member of the first aspect wherein the pair of wing portions are respectively disposed at both width direction sides of the engagement shaft portion. Such a core member is accordingly unable to adequately alleviate stress concentration at the base portions of the wing portions.

According to the crawler core member of the first aspect, coupling can be achieved by a simple operation without employing dedicated coupling components, and deformation due to input from the road surface can be effectively suppressed.

Note that the wing portions extending towards the width direction outsides referred to above include wing portions that extend from width direction insides towards the width direction outsides, as well as including for example wing portions that extend along the width direction and wing portions that extend at an angle with respect to the width direction or are curved.

A crawler core member of a second aspect of the present invention is the crawler core member of the first aspect wherein the diameter of the engagement shaft portion is a value of 30% of a separation distance between the centers of the engagement shaft portion of the core member and the engagement shaft portion of the adjacent core member in a coupled-together state of the adjacent core members, or a greater value.

In the crawler core member of the second aspect, the diameter of the engagement shaft portion is a value of 30% of the separation distance between the centers of the engagement shaft portion of the core member and the engagement shaft portion of the adjacent core member in a coupled-together state of the adjacent core members, or a greater value. Adequate strength of the engagement shaft portion is accordingly secured, and deformation of the engagement shaft portion due to input from the road surface is suppressed. Note that the coupled-together state of adjacent core members referred to above indicates a coupled state wherein the engagement shaft portion of the adjacent core member is engaged with the engagement portion of the core member and tension is applied along the peripheral direction of the adjacent core members.

A crawler core member of a third aspect of the present invention is the crawler core member of the first aspect wherein the engagement portion is a groove that is open towards the peripheral outside of the crawler belt, and a portion of the engagement portion that contacts the engagement shaft portion of the adjacent core member in a coupled-together state of the adjacent core members is shaped so as to follow the outer peripheral face of the engagement shaft portion.

In the crawler core member of the third aspect, the contact portion of the engagement portion that contacts the engagement shaft portion of the adjacent core member in the coupled-together state of the adjacent core members is shaped so as to follow the outer peripheral face of the engagement shaft portion. The contact surface area between the engagement portion of the core member and the engagement shaft portion of the adjacent core member is accordingly greater than that of, for example, a case in which the contact portion of the engagement portion that contacts the engagement shaft portion of the adjacent core member in the coupled-together state of the adjacent core members is not shaped so as to follow the outer peripheral face of the engagement shaft portion. Tension acting in the coupled-together state of adjacent core members can accordingly be adequately withstood. Localized abrasion progression of the engagement portion can also be suppressed.

A crawler core member of a fourth aspect of the present invention is the crawler core member of the third aspect further including a restriction portion that is integrally formed to the engagement portion, that projects from an opening side end portion of a groove wall on the opposite side of the engagement portion to the engagement shaft portion side towards the engagement shaft portion side, and that in an engaged state of the engagement portion and the engagement shaft portion of the adjacent core member restricts movement of the engagement shaft portion towards the peripheral outside by overlapping and contacting the engagement shaft portion.

In the crawler core member of the fourth aspect, the restriction portion that is formed to the engagement portion overlaps the engagement shaft portion of the adjacent core member in an engaged state of the engagement portion and the engagement shaft portion of the adjacent core member, and movement of the engagement shaft portion towards the peripheral outside is restricted due to the restriction portion contacting the engagement shaft portion of the adjacent core member. Movement of the engagement shaft portion of the adjacent core member towards the peripheral inside is restricted due to the engagement shaft portion of the adjacent core member contacting a groove bottom side of the engagement portion of the core member. Namely, relative movement between adjacent core members in the in-out direction of the crawler belt is suppressed. Decoupling (a release of the coupled state) of coupled adjacent core members when the crawler is traveling is accordingly suppressed.

A crawler core member of a fifth aspect of the present invention is the crawler core member of the third aspect wherein the engagement shaft portion further includes a protrusion provided to a portion of the engagement shaft portion on the opposite side to a portion of the engagement shaft portion that contacts the engagement portion of the other adjacent core member in a coupled-together state of the adjacent core members, the protrusion projecting in the peripheral direction and extending from a first width direction end to the other width direction end of the engagement shaft portion.

In the crawler core member of the fifth aspect, the engagement shaft portion further includes the protrusion provided to a portion of the engagement shaft portion on the opposite side to a portion of the engagement shaft portion that contacts the engagement portion of the other adjacent core member in a coupled-together state of the adjacent core members, the protrusion projecting in the peripheral direction and extending from a first width direction end to the other width direction end of the engagement shaft portion. The cross-sectional area of the engagement shaft portion is accordingly increased, effectively suppressing deformation of the engagement shaft portion due to input from the road surface received by the wing portions.

A crawler core member of a sixth aspect of the present invention is the crawler core member of the first aspect further including a pair of peripheral inside projection portions that are integrally formed to the engagement shaft portion, that are respectively disposed between both end portions of the engagement shaft portion and the pair of wing portions, and that project towards the peripheral inside of the crawler belt and extend along the peripheral direction, with the engagement portion formed to the extended portions of the peripheral inside projection portions, wherein: the width of the pair of peripheral inside projection portions is narrower on the engagement portion side than on the engagement shaft portion side; and in a coupled-together state of the adjacent core members the engagement portion side of the pair of peripheral inside projection portions of the core member fits inside the engagement shaft portion side of the pair of peripheral inside projection portions of the adjacent core member.

In the crawler core member of the sixth aspect, in a coupled-together state of the adjacent core members the engagement portion side of the pair of peripheral inside projection portions of the core member fits inside the engagement shaft portion side of the pair of peripheral inside projection portions of the adjacent core member. Relative movement in the width direction between the core member and the adjacent core member is accordingly restricted due to the engagement portion side of the pair of peripheral inside projection portions of the core member and the engagement shaft portion side of the pair of peripheral inside projection portions of the adjacent core member making contact with each other.

A crawler core member of a seventh aspect of the present invention is the crawler core member of the sixth aspect wherein the peripheral inside projection portions further include reinforcement ribs provided to the width direction inside faces and/or outside faces of the peripheral inside projection portions so as to project out in the width direction and extend along the peripheral direction.

In the crawler core member of the seventh aspect, the peripheral inside projection portions are provided with the reinforcement ribs to the width direction inside faces and/or outside faces of the peripheral inside projection portions so as to project out in the width direction and extend along the peripheral direction. The durability of the peripheral inside projection portions to peripheral direction tension and resulting shear force is accordingly enhanced.

The crawler core member of the seventh aspect can also enhance durability whilst suppressing an increase in weight in comparison with a core member wherein durability is increased by simply increasing the overall thickness of the peripheral inside projection portions.

A crawler core member of an eighth aspect of the present invention is the crawler core member of the seventh aspect wherein a portion of the reinforcement ribs is provided following the outer peripheral shape of the engagement portion.

In the crawler core member of the eighth aspect, the engagement portion that receives tension when the crawler is traveling is reinforced by forming a portion of the reinforcement ribs so as to follow the outer peripheral shape of the engagement portion. Deformation of the core member (engagement portion) due to tension when the crawler is traveling is accordingly suppressed, and the durability of the core member is enhanced.

A crawler core member of a ninth aspect of the present invention is the crawler core member of the seventh aspect wherein the engagement shaft portion sides of the peripheral inside projection portions include insertion portions into which at least a portion of each of the reinforcement ribs provided to the outside faces of the peripheral inside projection portions of the adjacent core member is inserted in a coupled-together state of the adjacent core members. The insertion portions restrict the engagement shaft portion of the core member from moving in a direction to come out of the engagement portion of the adjacent core member by contacting at least a portion of the reinforcement ribs of the adjacent core member.

In the crawler core member of the ninth aspect, the engagement shaft portion of the core member is restricted from moving in a direction to come out of the engagement portion of the adjacent core member due to the insertion portions of the core member contacting at least a portion of the reinforcement ribs of the adjacent core member. Coupled-together adjacent core members are accordingly suppressed from decoupling when the crawler is traveling.

In a rubber crawler of a tenth aspect of the present invention a rubber resilient body is disposed to the peripheral outside of a crawler belt configured employing plural of the crawler core members of the first aspect.

In the rubber crawler of the tenth aspect, the productivity of the rubber crawler can be enhanced, deformation due to input from the road surface is suppressed, and the durability of the rubber crawler is enhanced due to employing a crawler belt configured by coupling together crawler core members that can be coupled by a simple coupling operation without employing dedicated coupling components, and that can suppress deformation due to input from the road surface.

Advantageous Effects of Invention

As described above, the crawler core member of the present invention can be coupled together by a simple operation without employing dedicated coupling components, and can suppress deformation due to input from the road surface. Productivity of the rubber crawler of the present invention is also enhanced, deformation due to input from the road surface is suppressed, and durability is enhanced due to employing a crawler belt configured by coupling together core members that can be coupled by a simple coupling operation without employing dedicated coupling components, and that can suppress deformation arising from input from the road surface.

BRIEF DESCRIPTION OF THE DRAWINGS

FIG. 2 is a plan view of an inner peripheral face of a rubber crawler of the first exemplary embodiment of the present invention.

FIG. 3 is a cross-section taken along line 3-3 of FIG. 2.

FIG. 4 is a perspective view of a core member of the first exemplary embodiment of the present invention, viewed diagonally from above.

FIG. 5A is a plan view of a core member of the first exemplary embodiment.

FIG. 5B is a side view of the core member illustrated in FIG. 5A.

FIG. 5C is a face-on view of the core member illustrated in FIG. 5A viewed along the direction of arrow C.

FIG. 5D is a cross-section of the core member illustrated in FIG. 5A taken along line D-D.

FIG. 11 is a perspective view of a core member of a second exemplary embodiment, viewed diagonally from above.

FIG. 12A is a plan view of a core member of the second exemplary embodiment.

FIG. 12B is a side view of the core member illustrated in FIG. 12 A.

FIG. 12C is a face-on view of the core member illustrated in FIG. 12A, viewed along the direction of the arrow C.

FIG. 12D is a cross-section of the core member illustrated in FIG. 12A, taken along line D-D.

FIG. 13 is a plan view of an inner peripheral face of a crawler belt configured by coupling together core members of the second exemplary embodiment.

FIG. 14 is a side view of core members of the second exemplary embodiment in a state in which force in mutually approaching directions is acting on the coupled-together core members.

FIG. 17 is a plan view of an inner peripheral face of a crawler belt configured by coupling together core members of the third exemplary embodiment.

FIG. 18 is a side view of core members of the third exemplary embodiment in a state in which force is acting on the coupled-together core members in the direction to approach each other.

FIG. 20 is a perspective view of a core member of a Comparative Example, viewed diagonally from below.

BEST MODE FOR CARRYING OUT THE INVENTION

First Exemplary Embodiment

Explanation follows regarding a first exemplary embodiment of a crawler core member and a rubber crawler employing the core member of the present invention, with reference to FIG. 1 to FIG. 9.

Figure 1:
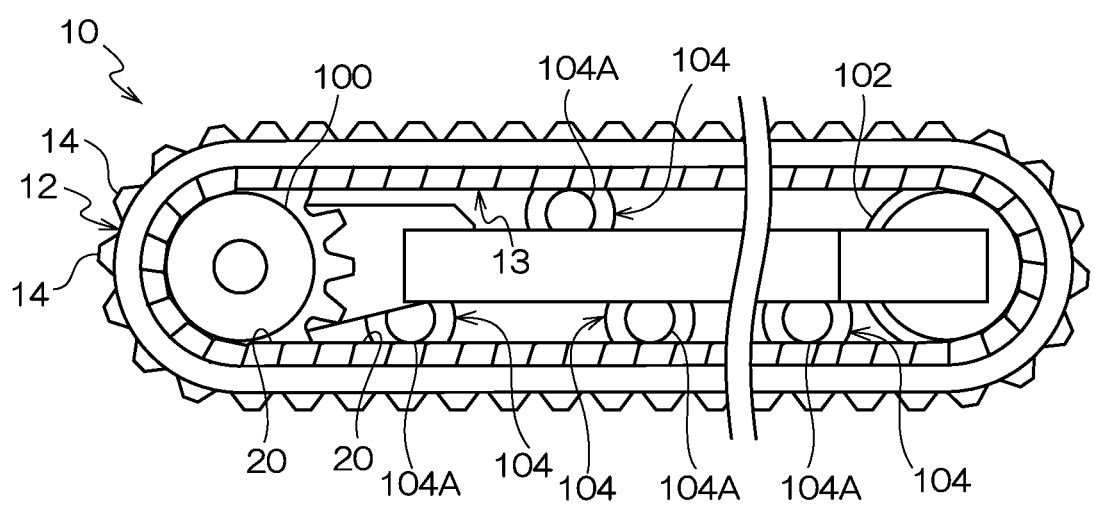
FIG. 1 is a side view of a rubber crawler of a first exemplary embodiment of the present invention.

As illustrated in FIG. 1, a rubber crawler 10 of the first exemplary embodiment is employed wound around a sprocket 100 and an idler 102 of a crawler vehicle. An endless rubber resilient body 12 configured from a resilient body such as rubber is disposed to a peripheral outside of an endless crawler belt 13.

Hereafter, reference simply to "peripheral direction" refers to the peripheral direction of the rubber crawler 10, and is indicated by the arrow S. "Width direction" refers to the rubber crawler 10 width direction, and is indicated by the arrow W. Note that the width direction and the peripheral direction are orthogonal to each other.

The "in-out direction" refers to the in-out direction of the rubber crawler 10, and the in-out direction is indicated by the arrows IN and OUT. Arrow IN indicates the peripheral inside of the rubber crawler 10, and is referred to simply as "peripheral inside". Arrow OUT indicates the peripheral outside of the rubber crawler 10 and is referred to simply as "peripheral outside".

As illustrated in FIG. 1 and FIG. 3, an outer peripheral face of the rubber resilient body 12 is formed with lugs 14 separated at specific intervals along the peripheral direction. In the present exemplary embodiment, the lugs 14 are configured extending in the width direction, however there is no limitation thereto and for example the lugs 14 may be angled with respect to the width direction. The shape of the lugs 14 may be any shape that can exhibit adequate traction force, for example, of the rubber crawler.

As illustrated in FIG. 1 and FIG. 2, plural core members 20 (see FIG. 4 and FIG. 5) are embedded at the peripheral inside of the rubber resilient body 12 at uniform intervals along the peripheral direction. Adjacent of the plural core members 20 are coupled together along the peripheral direction to configure the endless crawler belt 13. Detailed description of the crawler belt 13 and the core members 20 is given later.

As illustrated in FIG. 2, sprocket engagement holes 16 (through holes from an inner peripheral face to the outer peripheral face of the rubber resilient body 12) with which tooth portions of the sprocket 100 engage (fit together) are formed at a width direction central portion of the rubber resilient body 12. Drive force from the sprocket 100 is transmitted to the rubber crawler 10 by the tooth portions of the sprocket 100 engaging with the sprocket engagement holes 16. Note that in the present exemplary embodiment, the sprocket engagement holes 16 with which the tooth portions of the sprocket 100 engage (fit together) are formed in the rubber resilient body 12, however recess portions may be formed in the inner peripheral face of the rubber resilient body 12 provided that the tooth portions of the sprocket 100 are able to engage (fit together).

As illustrated in FIG. 2 and FIG. 3, a pair of guide wall portions 26, described later, project towards the peripheral inside of the core members 20 that are embedded in the rubber resilient body 12. Apex faces 26D of each of the guide wall portions 26 are exposed at the inner peripheral face of the rubber resilient body 12. Note that in the present exemplary embodiment, each of the apex faces 26D of the pair of guide wall portions 26 is configured so as to be exposed at the inner peripheral face of the rubber resilient body 12, however the present invention is not limited thereto and each of the apex faces 26D of the pair of guide wall portions 26 may be configured such that they are not exposed.

As illustrated in FIG. 1 and FIG. 2, the sprocket 100 and the idler 102 are configured so as to pass between the pair of guide wall portions 26. Rollers 104, configured from a cylindrical column shaped large diameter portion and cylindrical column shaped small diameter portions 104A provided coaxially to side faces of the large diameter portion, are configured such that the small diameter portions 104A pass over the apex faces 26D of the guide wall portions 26, and the large diameter portions pass between the pair of guide wall portions 26. More specifically, the rollers 104 are configured such that, due to the outer peripheral faces of the small diameter portions 104A being supported on and in contact with the apex faces 26D of the guide wall portions 26, or on rubber over the apex faces 26D, the outer peripheral face of the large diameter portion does not contact a rubber portion (a rubber portion over a sprocket engagement portion 24) between the pair of guide wall portions 26. Note that the rollers 104 are provided with the small diameter portions 104A at both side faces of the large diameter portion, however configuration may also be made such that a small diameter portion 104A is provided only at one side face of the large diameter portion. Moreover, in the present exemplary embodiment, the rollers 104 are configured from the large diameter portion that passes between the pair of guide wall portions 26 and the small diameter portions 104A that pass over the apex faces 26D of the guide wall portions 26, however the present invention is not limited to such a configuration, and the rollers 104 may be configured with a different configuration. For example, the rollers 104 may be configured by a small diameter portion 104A that passes over each of the apex faces 26D of the pair of guide wall portions 26, and a pair of large diameter portions that are provided at both side faces of the small diameter portions 104A on either side of the pair of guide wall portions 26.

Note that the sprocket 100 and the idler 102 may also have configurations other than that of the present exemplary embodiment shown in FIG. 1.

Explanation Follows Regarding the Core Member 20
Overall Configuration of the Core Member As illustrated in FIG. 4 and FIG. 5A to FIG. 5C, the core member 20 includes the following: a cylindrical column shaped pin portion 22 provided at a width direction central portion and extending along the width direction; the pair of guide wall portions 26 respectively disposed at both width direction outsides of the pin portion 22, supporting both end portions of the pin portion 22 and projecting towards the peripheral inside and extending along the peripheral direction; the substantially columnar sprocket engagement portion 24 disposed at a position separated from the pin portion 22 in the peripheral direction and respectively supported at both end portions by the pair of guide wall portions 26; a pair of wing portions 30 respectively disposed to both width direction sides of the pin portion 22 with the pin portion 22 in-between, and extending towards the width direction outsides from width direction outside faces of the pair of guide wall portions 26; and a pair of hooking grooves 34 respectively provided at peripheral outside portions of the sprocket engagement portion 24 side of the pair of guide wall portions 26 and extending in the width direction, each of the hooking grooves 34 hooking onto the pin portion 22 of another core member. Note that the core members 20 of the present exemplary embodiment are configured with left-right symmetry about a width direction center line CL.

The pin portion 22, the sprocket engagement portion 24, the pair of guide wall portions 26, the pair of wing portions 30, and the pair of hooking grooves 34 of the core member 20 are integrally formed.

Note that the pin portion 22 of the present exemplary embodiment is an example of an engagement shaft portion, the pair of guide wall portions 26 are an example of a pair of peripheral inside projection portions, the pair of wing portions 30 are an example of a pair of wing portions, and each of the pair of hooking grooves 34 is an example of an engagement portion.

Pin Portion

As illustrated in FIG. 5D, the pin portion 22 is configured with a circular cross-section profile. As illustrated in FIG. 7B, the diameter D of the pin portion 22 is preferably set at a value of 30% of a separation distance L between centers of a pin portion 22 of a first core member 20 and a pin portion 22 of a second core member 20 in a coupled-together state of adjacent core members 20, or a greater value. Note that the diameter D of the pin portion 22 is more preferably set at a value of 35% of the center separation distance L, or a greater value. The coupled-together state of adjacent core members 20 referred to above indicates a coupled state wherein the hooking grooves 34 of a (first) core member 20 are hooked onto a pin portion 22 of an adjacent (second) core member 20, with peripheral direction tension applied to the adjacent core members 20.

Hooking Grooves

As illustrated in FIG. 4, FIG. 5B and FIG. 5D, the hooking grooves 34 are respectively provided at peripheral outside portions (portions on the peripheral outside) of the pair of guide wall portions 26 such that the hooking grooves 34 are open towards the peripheral outside. More specifically, the hooking grooves 34 are provided to groove-side wall portions 26B of the guide wall portions 26, described later.

As illustrated in FIG. 5B and FIG. 7, portions of the hooking grooves 34 that contact the pin portion 22 of an adjacent core member 20 in a coupled-together state of adjacent core members 20 are configured with a shape that follows the outer peripheral face of the pin portion 22. More specifically, the shape of a groove wall 34A and a groove bottom 34B on the opposite side of the hooking groove 34 to the pin portion 22 as seen from the side of the core member 20 configures a curved shape following the outer peripheral face of the pin portion 22. Note that a groove wall 34C that is on the pin portion 22 side of the hooking groove 34 is configured with an inclined shape, inclined from the groove bottom 34B towards the pin portion 22 side as seen from the side of the core member 20.

Restriction Portion

As illustrated in FIG. 4, FIG. 5B and FIG. 5D, a restriction portion 40 is provided to an opening side end portion (peripheral outside end portion) of the groove wall 34A that is on the side of the hooking groove 34 opposite to the pin portion 22. The restriction portion 40 projects from the opening side end portion towards the pin portion 22 side. The opening of the hooking groove 34 is narrowed by the restriction portion 40. The restriction portion 40 also has a peripheral direction length set such that at least a leading end portion of the restriction portion 40 overlaps with the pin portion 22 of an adjacent core member 20 in a coupled-together state of adjacent core members 20. As illustrated in FIG. 5D, a length A of the restriction portion 40 indicates a distance in the peripheral direction between an intersection P of a straight line XL extending in the peripheral direction from the center of the pin portion 22 and the groove wall 34A of the hooking groove 34, and the leading end of the restriction portion 40. By way of an example, in the present exemplary embodiment the length A is set at 4 mm or greater.

According to the above configuration, in a coupled-together state of adjacent core members 20, the pin portion 22 of an adjacent core member 20 that is hooked by the hooking groove 34 of a given core member 20 is restricted from moving towards to peripheral outside due to contacting the restriction portion 40.

As illustrated in FIG. 5B, the hooking groove 34 and the restriction portion 40 are integrally formed, and the peripheral inside faces of the groove wall 34A of the hooking groove 34 and the restriction portion 40 form a continuous curve.

In the present exemplary embodiment, the restriction portion 40 is formed continuously to the opening side end portion of the groove wall 34A in the width direction. However the present invention is not limited to such a configuration and for example configuration may be made wherein the restriction portion 40 is formed intermittently to the opening side end portion of the groove wall 34A in the width direction.

Sprocket Engagement Portion

As illustrated in FIG. 4, the sprocket engagement portion 24 couples together width direction inside end portions of the pair of hooking grooves 34. Also, as illustrated in FIG. 5B and FIG. 5D, a peripheral outside portion 24A (a portion on the peripheral outside) of the sprocket engagement portion 24 is configured with a shape that follows the wall faces of the hooking groove 34 and the inner peripheral faces of the restriction portion 40. The hooking groove 34 is reinforced by the sprocket engagement portion 24.

Accordingly, deformation of the hooking groove 34 due to tension from the pin portion 22 hooked by the hooking groove 34 is suppressed. The pin portion 22 hooked by the hooking groove 34 is also in contact with the peripheral outside portion 24A of the sprocket engagement portion 24, increasing the contact surface area in comparison to, for example, a configuration wherein the pin portion 22 only makes contact with the hooking grooves 34, thereby reducing the speed at which the hooking grooves 34 are abraded.

The shape of a peripheral inside portion (the portion on the peripheral inside) of the sprocket engagement portion 24 is configured as a curved shape convex on the peripheral inside.

Guide Wall Portion

As illustrated in FIG. 4 and FIG. 5B to FIG. 5D, the guide wall portions 26 are configured with a substantially trapezoidal shape as viewed from the side, and the apex faces 26D (peripheral inside end faces) are configured with a flattened profile. Note that the shape of the guide wall portions 26 is not limited to a trapezoidal shape in side view, and other shapes are also possible, for example an inverted trapezoidal shape or a rectangular shape. Note that vibration of the rubber crawler 10 when the small diameter portions 104A of the rollers 104

(see FIG. 1, FIG. 8) pass across the apex faces 26D can be suppressed by configuring the apex faces 26D with a flattened profile.

Moreover, as illustrated in FIG. 4 and FIG. 5A to FIG. 5C, the guide wall portions 26 are each configured by a pin-side wall portion 26A on the pin portion 22 side, the groove-side wall portion 26B on the hooking groove 34 side that is positioned further to the width direction inside than the pin-side wall portion 26A, and a coupling wall portion 26C that couples together the pin-side wall portion 26A and the groove-side wall portion 26B. Accordingly, as illustrated in FIG. 5A, the width direction external width of facing groove-side wall portions 26B is narrower than the external width of facing pin-side wall portions 26A when the pair of guide wall portions 26 are viewed from the peripheral inside.

Figure 6:
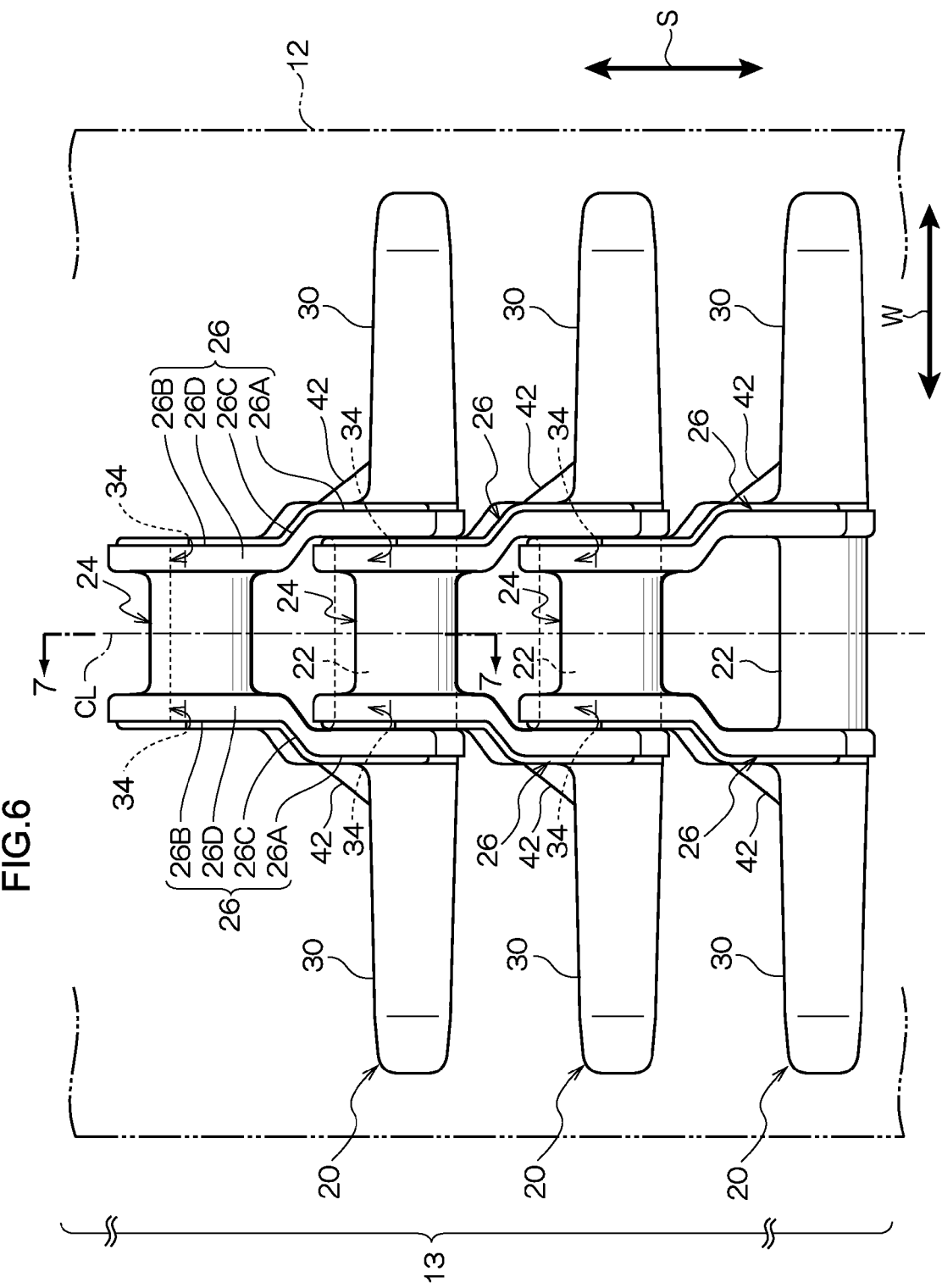
FIG. 6 is a plan view of an inner peripheral face of a crawler belt configured by coupling together core members of the first exemplary embodiment.

As illustrated in FIG. 6, the internal width between the pin-side wall portions 26A and the external width between the groove-side wall portions 26B are set such that in a coupled-together state of adjacent core members 20, facing groove-side wall portions 26B of a first of the core members 20 fit in between facing pin-side wall portions 26A of a second core member 20.

As also illustrated in FIG. 6, respective guide wall portions 26 form a row in a straight line along the peripheral direction when adjacent core members 20 are coupled together to configure the crawler belt 13.

According to such a configuration, the sprocket 100, the idler 102 and the rollers 104 are guided towards a specific position by the guide wall portions 26 when the crawler is traveling. The sprocket 100, the idler 102 and the rollers 104 are thereby suppressed from coming off.

As illustrated in FIG. 6, a hollow portion is formed between the sprocket engagement portion 24 of a first of the core members 20 and the sprocket engagement portion 24 and the facing groove-side wall portions 26B of a second core member 20 when adjacent core members 20 are coupled together to configure the crawler belt 13. As illustrated in FIG. 2, the sprocket engagement holes 16 of the rubber resilient body 12 are formed at positions corresponding to the hollow portions. Accordingly, when the tooth portions of the sprocket 100 engage (fit together) with the sprocket engagement holes 16, drive force from the sprocket 100 is transmitted to the crawler belt 13 (the rubber crawler 10) through the sprocket engagement portions 24 and the pin portions 22 hooked by the sprocket engagement portions 24.

Wing Portions

As illustrated in FIG. 4 and FIG. 5A to FIG. 5C, the wing portions 30 extend towards the width direction outsides from positions on the guide wall portions 26 corresponding to width direction end portions of the pin portion 22.

By providing the pair of wing portions 30 to the core member 20, input (load) from a road surface when the crawler is traveling is also dispersed to the pair of wing portions 30, suppressing deformation of the core member 20.

Base portions of the wing portions 30 are further formed with reinforcement portions 42.

The wing portions 30 of the present exemplary embodiment extend in the width direction along a straight line with the pin portion 22. However, the present invention is not limited to such a configuration, and the wing portions 30 may extend at an angle with respect to the width direction, provided that the base portions of the wing portions 30 overlap with the pin portion 22 as viewed from the side.

The wing portions 30 of the present exemplary embodiment are also configured with pointed shapes having a width (length in the peripheral direction) becoming narrower towards the leading ends. However, the present invention is not limited to such a configuration and the wing portions may be configured with a shape of uniform width, or may be configured with a shape that is wider at the leading ends than at the base portions.

Explanation follows regarding a coupling operation of the core members 20, with reference to FIG. 6 and FIG. 7.

Figure 7A:
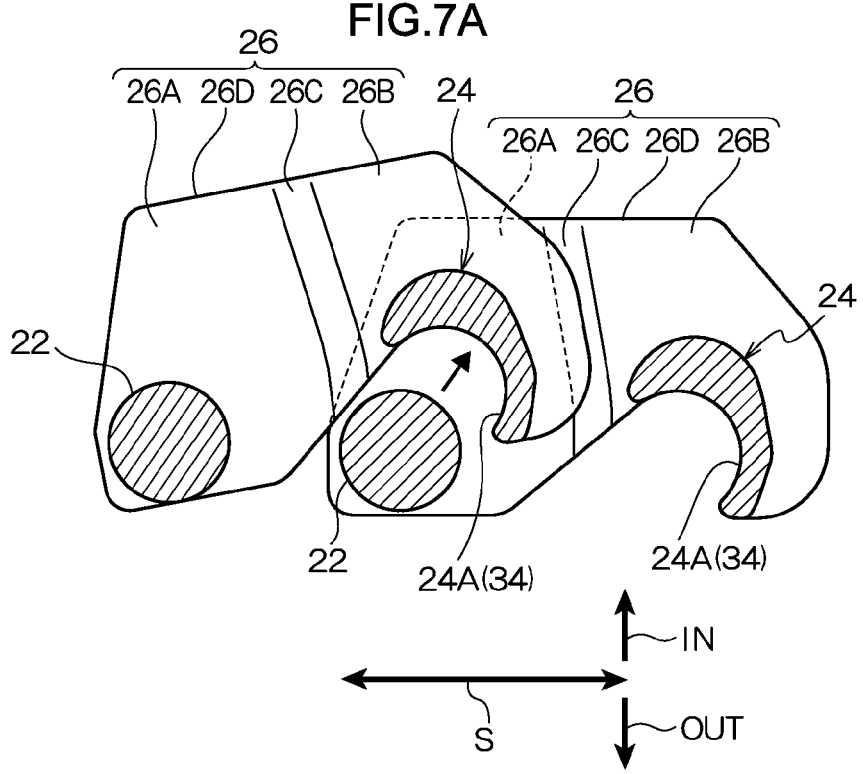
FIG. 7A is a cross-section taken along line 7-7 of FIG. 6 illustrating an operation to couple together core members of the first exemplary embodiment.
Figure 7B:
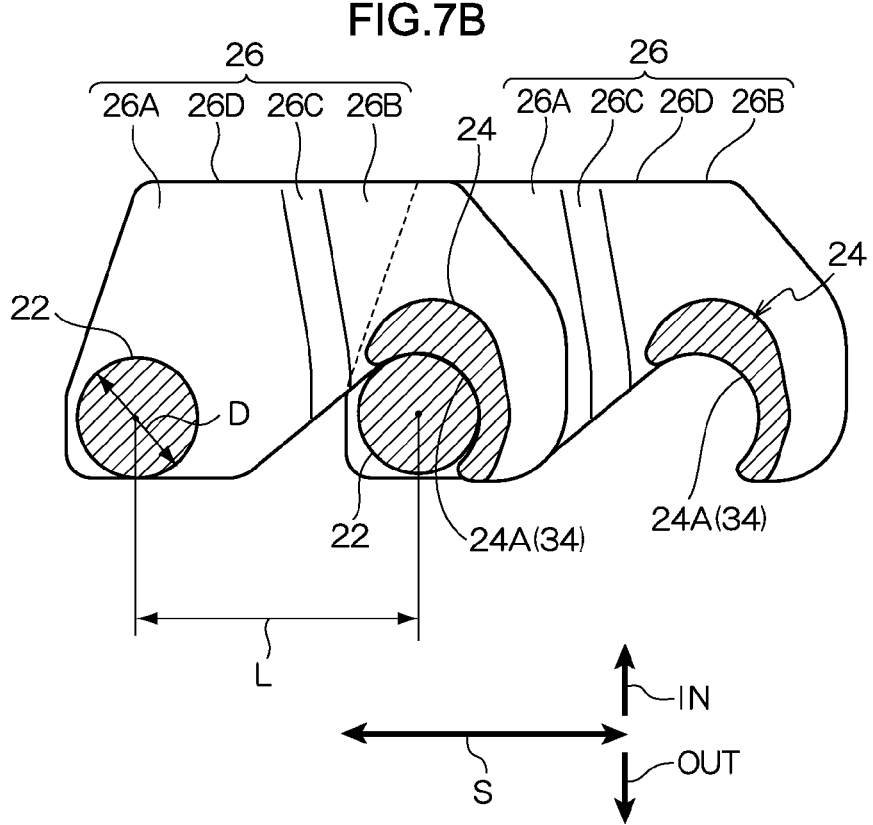
FIG. 7B is a cross-section taken along line 7-7 of FIG. 6 illustrating a coupled-together state of core members of the first exemplary embodiment.

First, as illustrated in FIG. 7A, the openings of the hooking grooves 34 of a first core member 20 are positionally aligned with the pin portion 22 of a second core member 20, and, as illustrated in FIG. 7B, the pin portion 22 of the second core member 20 is hooked into the hooking grooves 34 of the first core member 20. A coupled-together state between the first core member 20 and the second core member 20 is then achieved by applying peripheral direction tension to the first core member 20 and the second core member 20.

Here, as illustrated in FIG. 7B, when the pin portion 22 of the second core member 20 is hooked into the hooking grooves 34 of the first core member 20 and a coupled-together state between adjacent core members 20 is achieved, at least leading end portions of the restriction portions 40 of the first core member 20 overlap with the pin portion 22 of the second core member 20. The pin portion 22 of the second core member 20 that is hooked into the hooking grooves 34 of the first core member 20 is accordingly restricted from moving towards the peripheral outside due to contacting the restriction portions 40. The pin portion 22 of the second core member 20 that is hooked into the hooking grooves 34 of the first core member 20 is also restricted from moving towards the peripheral inside due to making contact with the groove bottoms 34B. Relative movement in the in-out direction between the first core member 20 and the second core member 20 is accordingly restricted.

As illustrated in FIG. 6, when the pin portion 22 of the second core member 20 is hooked into the hooking grooves 34 of the first core member 20, the facing groove-side wall portions 26B of the first core member 20 fit in between the facing pin-side wall portions 26A of the second core member 20. Accordingly, when relative movement occurs in the width direction between the first core member 20 and the second core member 20, the relative movement in the width direction between the first core member 20 and the second core member 20 is restricted due to contact being made between the groove-side wall portion 26B of the first core member 20 and the respective side wall portion 26A of the second core member 20.

Due to the above configuration, decoupling of coupled-together adjacent core members 20 is suppressed since relative movement is restricted between coupled-together adjacent core members 20 in both the in-out direction and the width direction.

The endless crawler belt 13 is configured by coupling together adjacent core members 20 according to the coupling operation described above.

Explanation follows regarding a manufacturing method of the rubber crawler 10. First, the endless crawler belt 13 is configured by coupling plural core members 20 by the coupling operation described above.

Next, an elongated green rubber resilient body 12 is wound onto the peripheral outside of the crawler belt 13 to form an endless green resilient rubber body. At this point, the crawler belt 13 is embedded in the peripheral inside of the green rubber resilient body 12. Note that each of the apex faces 26D of the pairs of guide wall portions 26 of the core members 20 may, or may not, be embedded in the green rubber resilient body 12. Obviously the green rubber resilient body may be also wound onto the peripheral inside of the crawler belt 13.

Next, the green rubber resilient body 12 is vulcanized such that rubber resilient body 12 vulcanizes and is vulcanize-bonded to the crawler belt 13, thereby manufacturing the rubber crawler 10.

Note that in the present exemplary embodiment, configuration is made such that after coupling the core members 20 to configure the crawler belt 13, the rubber resilient body 12 is formed to the peripheral outside of the crawler belt 13, however there is no limitation thereto. Pre-vulcanized rubber resilient body pieces may be formed to at least the peripheral outsides of the core members 20 and the core members 20 coupled together to configure the crawler belt 13. In such cases, an endless rubber crawler 10 can be configured by coupling core members 20 having pre-vulcanized rubber resilient body pieces with portions of coupling sections (the pin portions 22 and the hooking grooves 34 that are at the crawler belt 13 peripheral direction end portions) not covered by rubber.

Moreover, configuration may also be made wherein plural core members 20 are coupled together to configure a belt shaped core member coupled body having a length equivalent to one rubber crawler, a rubber resilient body is vulcanized to at least a peripheral outside of the core member coupled body to form a belt shaped crawler configuration member, and the rubber crawler 10 is configured by coupling together length direction end portions of the belt shaped crawler configuration member to form a ring shape. If such a configuration is adopted, for example a single rubber crawler 10 can be stored and shipped in the state of a single belt shaped crawler configuration member. Accordingly, the storage space when storing and shipping plural rubber crawlers 10 can be reduced by stacking and storing plural rubber crawlers 10 as single belt shaped crawler configuration members.

The endless rubber crawler 10 may also be configured from plural belt shaped core member coupled bodies, sufficient for one rubber crawler when added together. The coupled bodies are configured by vulcanizing respective rubber resilient bodies to at least a peripheral outside of the core member coupled bodies, thereby forming plural belt shaped crawler configuration members. The belt shaped crawler configuration members are then coupled together at respective length direction end portions of the belt shaped crawler configuration members to configure a single belt shaped crawler configuration member, and then length direction end portions of the single belt shaped crawler configuration member are coupled together to form a ring shape that configures the endless rubber crawler 10. By adopting such a configuration, for example a single rubber crawler 10 can be stored and shipped in the state of plural belt shaped crawler configuration members. Accordingly, during storage and shipping of the rubber crawler 10, the storage space can be reduced by stacking and storing a single rubber crawler 10 in the state of plural belt shaped crawler configuration members.

Explanation follows regarding operation and advantageous effects of the core member 20 and the rubber crawler 10 of the first exemplary embodiment.

As described above, the core members 20 are coupled together by hooking the pin portion 22 of a second core member 20 into the hooking grooves 34 of a first core member 20, as illustrated in FIG. 7A and FIG. 7B. Namely, the core members 20 can be coupled together without employing a dedicated coupling component. In other words, the number of components in the rubber crawler 10 (the crawler belt 13) can be reduced.

The coupling operation of the core members 20 can be performed by the straightforward operation of hooking the pin portion 22 of the second core member 20 into the hooking grooves 34 of the first core member 20.

Moreover, by employing parts of the core members 20 to couple the core members 20 together, the peripheral direction rigidity of the crawler belt 13 configured from plural coupled-together core members 20 can be raised. Adequate tension can accordingly be secured in the rubber crawler 10.

As illustrated in FIG. 2, in the crawler belt 13 configured by coupling together the core members 20, the respective guide wall portions 26 of the core members 20 form a row along the peripheral direction. The crawler belt 13 can accordingly be suppressed from coming off from the sprocket 100 and the idler 102 that pass between the pairs of guide wall portions 26. Coming off from the rollers 104 with large diameter portions that pass between the pairs of guide wall portions 26 is also suppressed.

In known rubber crawlers, core members are disposed at uniform intervals along the peripheral direction at the peripheral inside of an endless rubber resilient body, with spiral wound or multiple wound steel cord so as to enclose the outer peripheries of the core members. In such types of known rubber crawlers, there is the concern for example that steel cord rusting might occur if the rubber resilient body were to be damaged and water were to penetrate through the damage, causing the steel cord to snap and reducing tension in the rubber crawler.

However, in the rubber crawler 10, it is possible to retain traditional tensions even suppose the tension-retaining steel cord of rubber crawlers were to be omitted. By employing the crawler belt 13 configured by coupling the core members 20, even were the rubber resilient body 12 to be damaged and water to penetrate through the damage, since the core members 20 are less vulnerable to damage than the steel cord of traditional rubber crawlers, a reduction in tension of the rubber crawler 10 is suppressed.

Forming the hooking grooves 34 to the pair of guide wall portions 26 achieves a simpler structure for the core member 20 than forming the hooking grooves 34 separately at a different location to the pair of guide wall portions 26, and can also suppress an increase in weight of the core member 20.

As described above, in a coupled-together state of adjacent core members 20 the pin portion 22 of a second core member 20 that is hooked into the hooking grooves 34 of a first core member 20 is restricted from moving towards the peripheral outside due to contact between the pin portion 22 and the restriction portion 40. The pin portion 22 of the second core member 20 that is hooked into the hooking grooves 34 of the first core member 20 is also restricted from moving towards to peripheral inside due to contact between the pin portion 22 and the groove bottoms 34B. Accordingly, relative movement between the first core member 20 and the second core member 20 in the in-out directions is restricted.

Also, as described above, when the pin portion 22 of a second core member 20 is hooked into hooking grooves 34 of a first core member 20, the facing groove-side wall portions 26B of the first core member 20 fit in between the facing pin-side wall portions 26A of the second core member 20. Therefore, when relative movement in the width direction occurs between the first core member 20 and the second core member 20, a groove-side wall portion 26B of the first core member 20 contacts a respective pin-side wall portion 26A of the second core member 20, restricting the relative movement between the first core member 20 and the second core member 20 in the width direction.

Due to the above, decoupling (release) of coupled-together core members 20 can accordingly be suppressed even when the crawler rides up over a projecting object such as a curb during travel.

Figure 19:
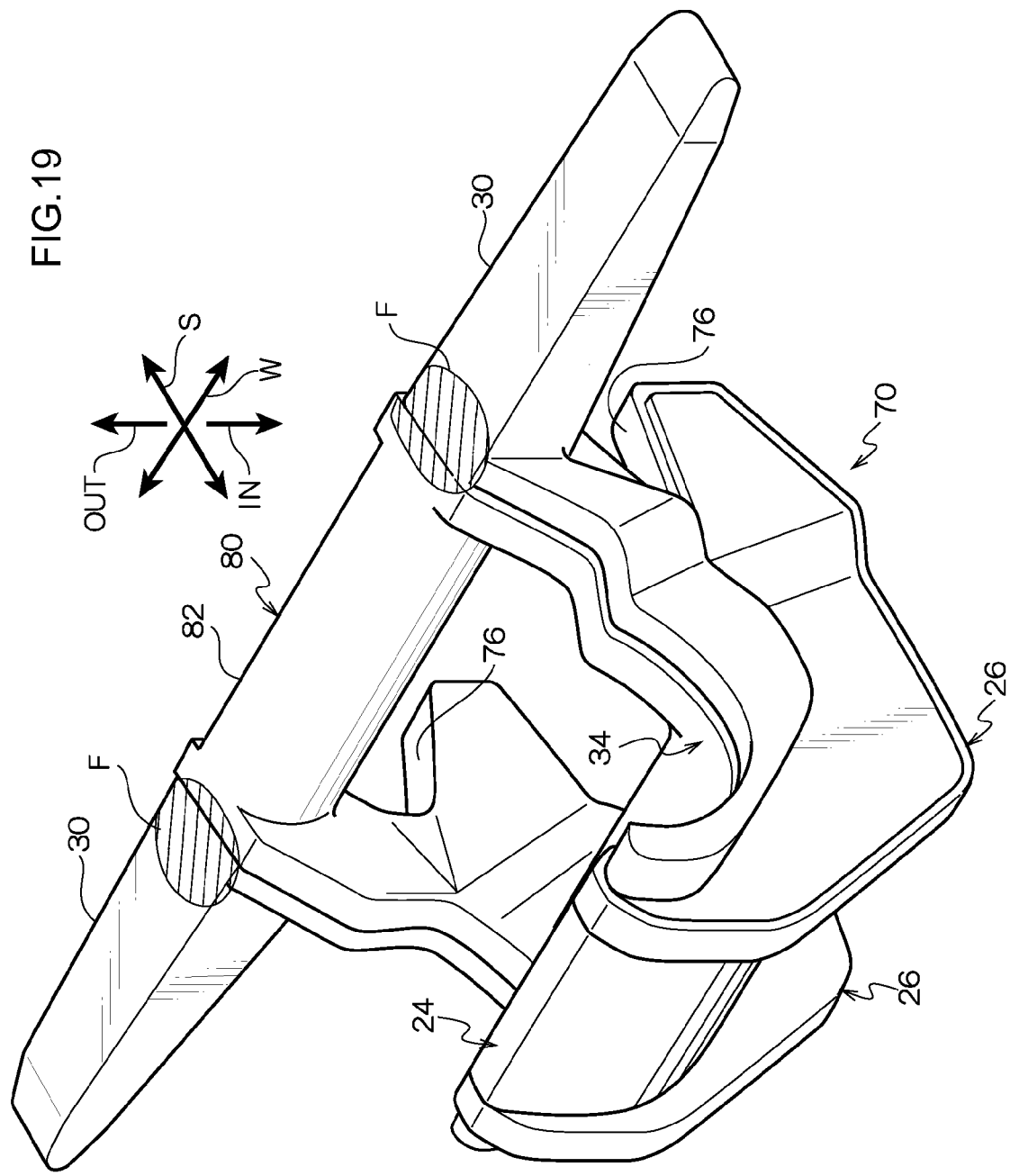
FIG. 19 is a perspective view of a core member of the third exemplary embodiment of the present invention, viewed diagonally from below.

The wing portions 30 of the core member 20 receive input from the road surface when the crawler is traveling. There is a tendency for stress due to this input to become concentrated at base portions F of the wing portions 30 (more specifically, the joint portions between the wing portions 30 and the guide wall portions 26 (see FIG. 19)).

In the core member 20, the pair of wing portions 30 are therefore integrally formed to the pin portion 22 and respectively disposed at both width direction sides of the pin portion 22.

Such a configuration suppresses deformation of the wing portions 30 since the input from the road surface received by the wing portions 30 is dispersed to the pin portion 22 integrally formed with the wing portions 30, alleviating stress concentration at the base portions F of the wing portions 30.

Figure 9:
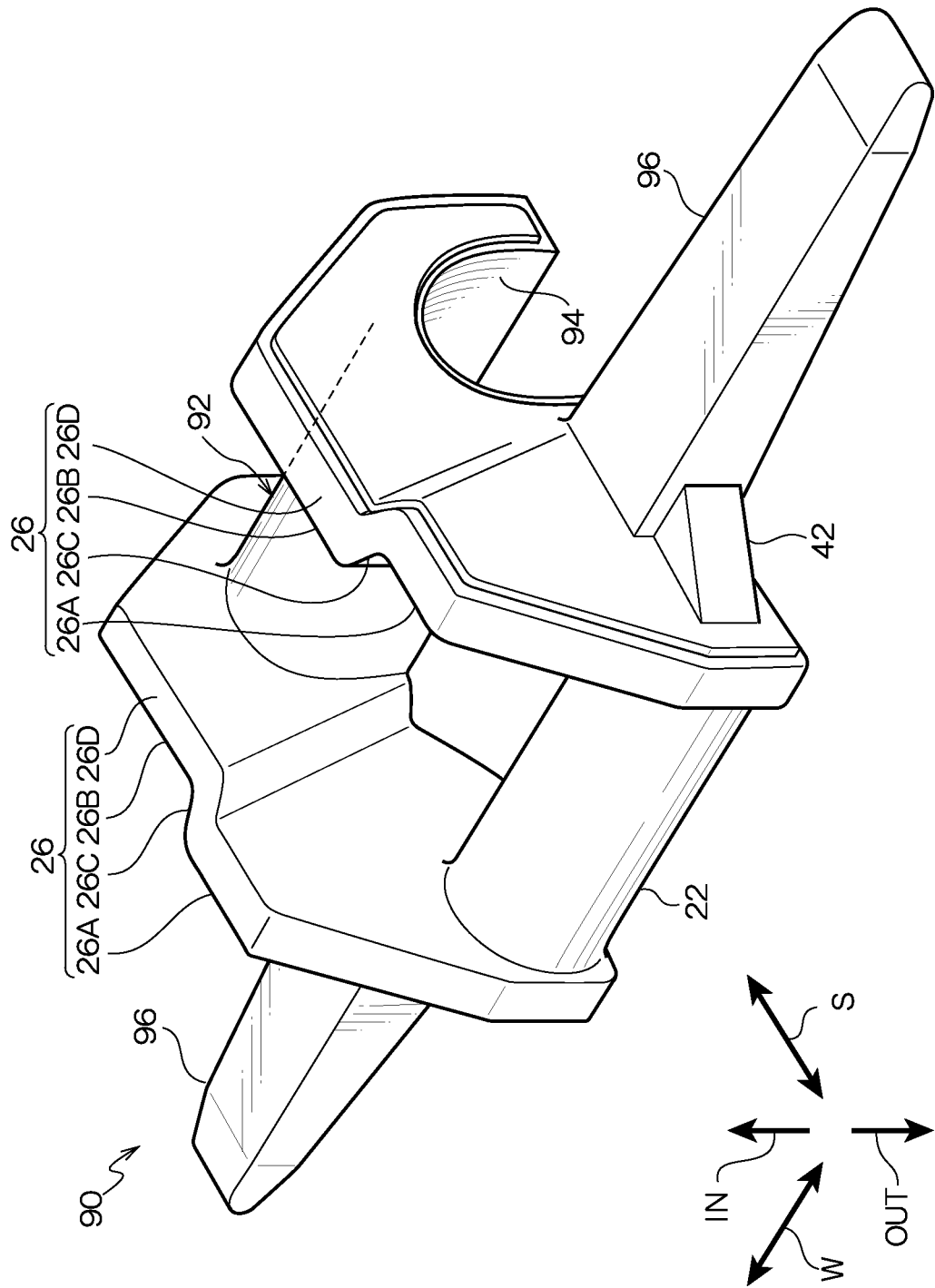
FIG. 9 is a perspective view a core member of a Comparative Example, viewed diagonally from above.

However, for example as illustrated in FIG. 9 and FIG. 20, in a core member 90 wherein a pair of wing portions 96 are respectively disposed to a pair of guide wall portions 26 between a pin portion 22 and hooking grooves 94 (with a substantially semicircular cross-section, and no restriction portion 40), the input from the road surface received by the wing portions 96 is not adequately dispersed to the pin portion 22 in comparison to the core member 20 wherein the pair of wing portions 30 are respectively disposed to both width direction sides of the pin portion 22. Adequate alleviation of stress concentration at base portions f of the wing portions 96 whilst achieving a reduction in weight is therefore not possible.

Accordingly, the core member 20 of the present exemplary embodiment can be coupled by a simple operation without employing dedicated coupling components, and deformation (deformation of the wing portions 30) due to input from the road surface can be effectively suppressed. Note that it is possible, for example, to increase the rigidity of the base portions of the wing portions 30 of the core member 90 by providing reinforcement members to the wing portions 30 of the core member 90, however in the core member 20 of the present exemplary embodiment, reinforcement members do not need to be provided since the input that the wing portions 30 receive from the road surface is dispersed to the pin portion 22, enabling increase in weight of the core member to be suppressed.

Figure 10:
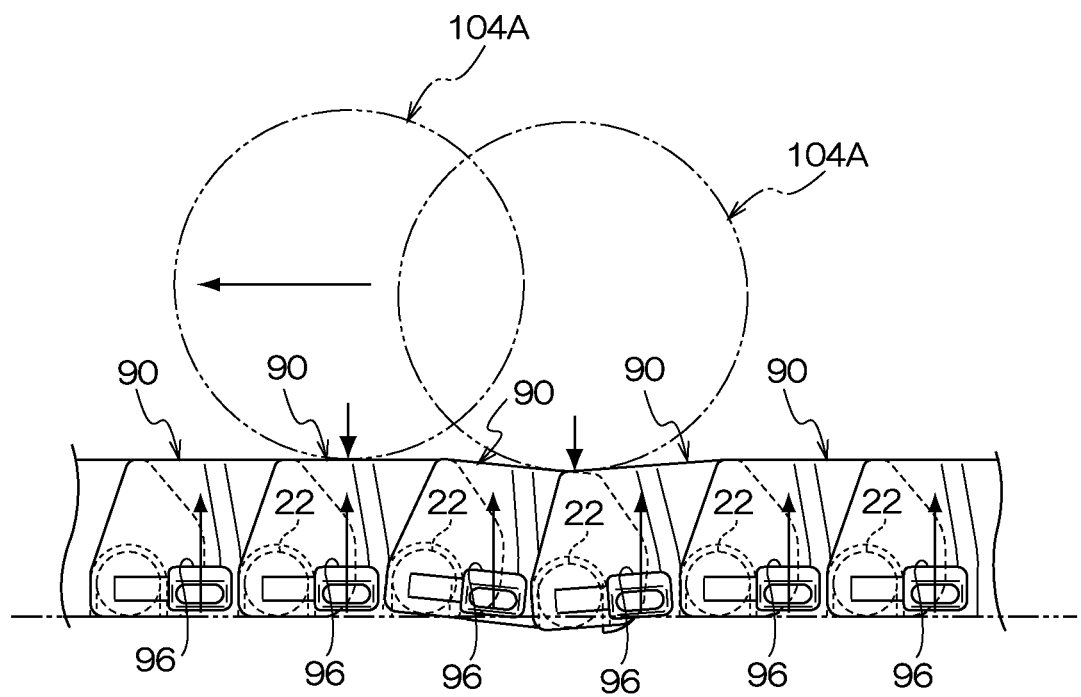
FIG. 10 is a side view of a crawler belt configured by coupling together core members of the Comparative Example, illustrating states in which a shaft portion of a roller passes over the crawler belt.

Explanation follows regarding operation of the core member 90 in a case where small radius portions 104A of rollers 104 pass over the apex faces 26D of coupled core members 90, as illustrated in FIG. 10. When a small radius portion 104A is positioned over a wing portion 96 of coupled core members 90, load from the small radius portions 104A is supported by the wing portions 96. However, when the small radius portion 104A is positioned over a pin portion 22 positioned between wing portions 96 of the coupled core members 90, the load from the small radius portion 104A cannot be supported by the wing portions 96, and adjacent core members 90 rotate about the pin portion 22 below the small radius portion 104A, such that the apex faces 26D of adjacent guide wall portions 26 are in a dipped state as viewed from the side, and the position of the small radius portion 104A moves downwards. Accordingly, up-down movement of the small radius portion 104A occurs between when the small radius portion 104A is positioned over a pin portion 22 and when the small radius portion 104A is positioned over a wing portion 96 in the coupled core members 90. This inputs vibration at a regular frequency to the small radius portion 104A passing over the apex faces 26D of the coupled core members 90.

Figure 8:
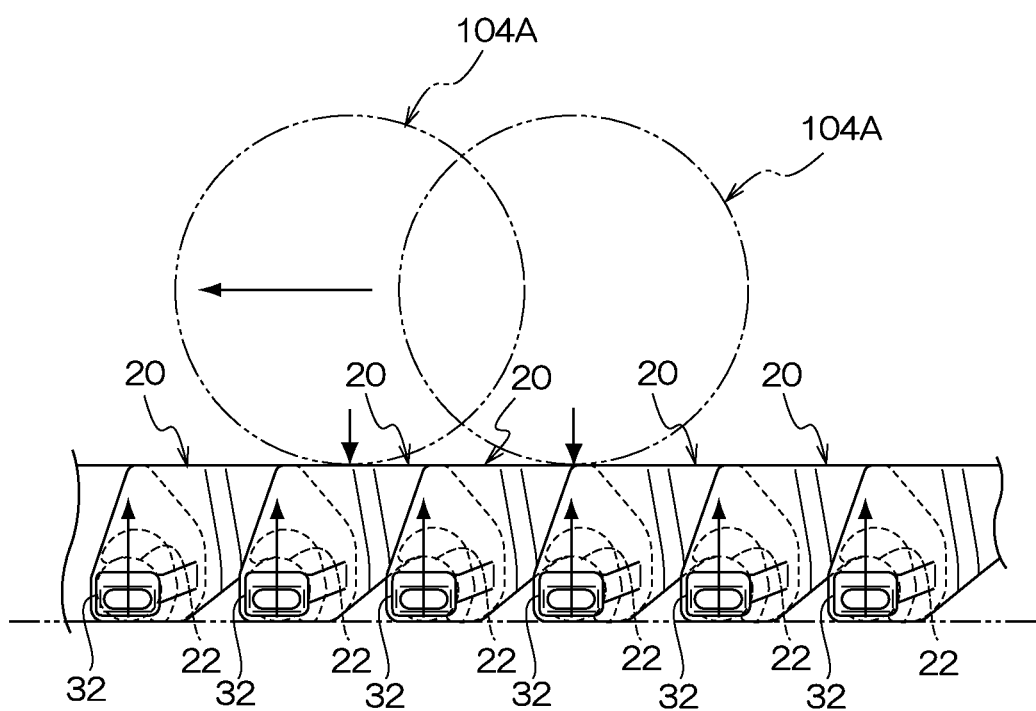
FIG. 8 is a side view of a crawler belt configured by coupling together core members of the first exemplary embodiment, illustrating states in which a shaft portion of a roller passes over the crawler belt.

However, as illustrated in FIG. 8, in the coupled core members 20, load from the small radius portions 104A is supported by the wing portions 30 when the small radius portions 104A are positioned over the wing portions 30. When the small radius portions 104A are positioned between the wing portions 30 of coupled core members 20, the load from the small radius portions 104A is supported by adjacent wing portions 30. Namely, since the wing portions 30 are respectively disposed at both width direction sides of the pin portions 22 in the core members 20, even when load is received from the small radius portions 104A, adjacent core members 20 do not rotate about the pin portion 22, so there is no up-down movement of the small radius portions 104A, and vibration at a regular frequency is not input into the small radius portions 104A passing over the apex faces 26D of the coupled core members 20.

In the core member 20 of the present exemplary embodiment, vibration can accordingly be suppressed during crawler travel.

The strength of the pin portion 22 is adequately secured, and deformation of the pin portions 22 resulting from road surface input received by the wing portions 30 is further suppressed, due to setting the diameter D of the pin portion 22 at a value of 30% of the separation distance L between centers of the pin portion 22 of the a first core member 20 and the pin portion 22 of a second core member 20 in a coupled-together state of adjacent core members 20, or a greater value.

Moreover, in a coupled-together state of adjacent core members 20, a contact portion of a hooking groove 34 that contacts the pin portion 22 of a first core member 20 is configured with a shape following the outer peripheral face of the pin portion 22.

Accordingly, the contact surface area between the hooking groove 34 of the first core member 20 and the pin portion 22 of the second core member 20 is larger than in cases in which for example the contact portion is not configured with a shape following the outer peripheral face of the pin portion 22. The hooking groove 34 and the pin portion 22 of the core member 20 can therefore adequately withstand the tension that acts during crawler travel.

Localized wear progression on the hooking grooves 34 due to the hooked-onto pin portion 22 can also be suppressed.

As explained above, due to employing a crawler belt 13 configured by coupling together core members 20 that can be coupled together with a simple operation without employing dedicated coupling components and that are capable of suppressing deformation due to input from the road surface, the productivity of the rubber crawler 10 is enhanced and also deformation due to input from the road surface is suppressed, enhancing the durability of the rubber crawler 10.

Second Exemplary Embodiment

Explanation follows regarding a second exemplary embodiment of a crawler core member and a rubber crawler employing the core member of the present invention. Note that in the present exemplary embodiment elements similar to the first exemplary embodiment are allocated the same reference numerals and detailed explanation thereof is omitted.

FIG. 11 to FIG. 14 illustrate a core member 50 of the second exemplary embodiment. As illustrated in FIG. 11 and FIG. 12, the core member 50 includes: projections 52 that project in the width direction from respective width direction outside faces of facing groove-side wall portions 26B of a pair of guide wall portions 26; and insertion grooves 56, each serving as an example of an insertion portion, that extend from peripheral direction end portions of facing pin-side wall portions 26A towards a groove-side wall portion 26B side.

As illustrated in FIG. 13 and FIG. 14, in a coupled-together state of adjacent core members 50 with a pin portion 22 of a second core member 50 hooked into a hooking groove 34 of a first core member 50, the projections 52 of the first core member 50 are inserted into the insertion grooves 56 of the second core member 50.

As illustrated in FIG. 14, the depth of the insertion grooves 56 is set such that when coupled-together core members 50 move in a mutually approaching direction, the inserted projections 52 contact the insertion grooves 56 before the pin portion 22 of the second core member 50 rides over a restriction portion 40 of the first core member 50 and reaches a position where it is possible to come out of the hooking groove 34.

Explanation follows regarding a coupling operation of the core member 50 of the second exemplary embodiment.

First, the positions of the opening of the hooking groove 34 of a first core member 50 and the pin portion 22 of a second core member 50 are positionally aligned with the first core member 50 and the second core member 50 in a state wherein the first core member 50 and the second core member 50 are tilted relative to each other, and the pin portion 22 of the second core member 50 is hooked into the hooking groove 34 of the first core member 50.

Next, the angle of relative tilt between the first core member 50 and the second core member 50 is adjusted such that the first core member 50 and the second core member 50 approach a parallel state (for example a state with the apex faces 26D of the first core member 50 parallel to the apex faces 26D of the second core member 50 as viewed from the side). When this is performed, the projections 52 of the first core member 50 are inserted into the insertion grooves 56 of the second core member 50. Then tension is applied to the first core member 50 and the second core member 50 in the peripheral direction in order to achieve a coupled-together state of the first core member 50 and the second core member 50. The first core member 50 and the second core member 50 are coupled together by this coupling operation.

Explanation follows regarding operation and advantageous effects of the core member 50 and a rubber crawler 46 of the second exemplary embodiment.

As illustrated in FIG. 14, when coupled-together core members 50 move in a mutually approaching direction, the projections 52 of a first of the core members 50 contact the insertion grooves 56 of a second of the core members 50, restricting movement in the mutually approaching direction of the coupled core members 50. Decoupling of the coupled-together core members 50 is therefore effectively suppressed.

Third Exemplary Embodiment

Explanation follows regarding a third exemplary embodiment of a core member for a crawler and a rubber crawler employing the core member of the present invention. Note that in the present exemplary embodiment elements similar to the first exemplary embodiment are allocated the same reference numerals and detailed explanation thereof is omitted.

Figure 15:
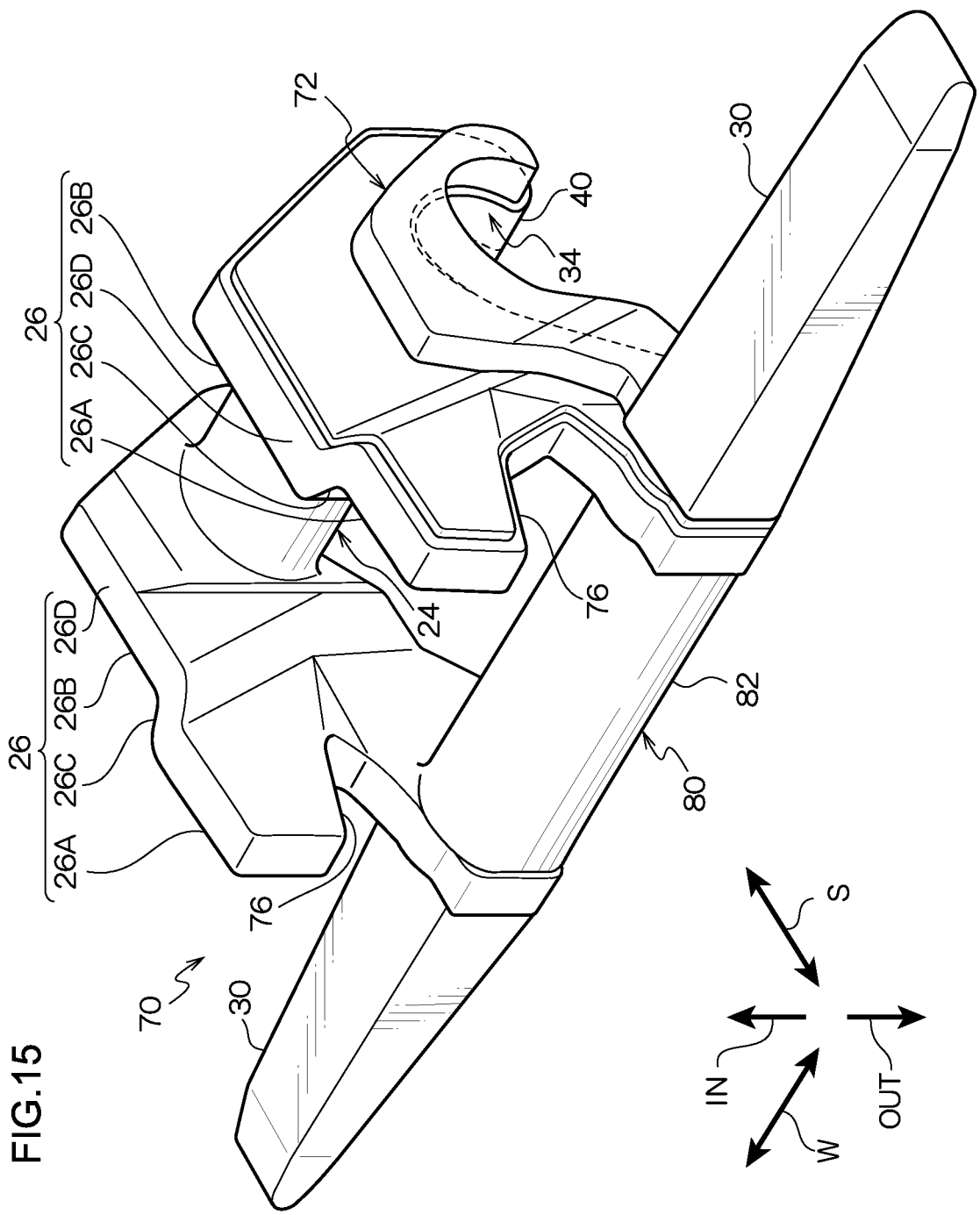
FIG. 15 is a perspective view a core member of a third exemplary embodiment of the present invention, viewed diagonally from above.

FIG. 15 to FIG. 18 illustrate a core member 70 of the third exemplary embodiment. As illustrated in FIG. 15 and FIG. 16, the core member 70 includes reinforcement ribs 72 respectively projecting in the width direction from width direction outer peripheral faces of facing groove-side wall portions 26B of a pair of guide wall portions 26 and extending in the peripheral direction, and insertion grooves 76, each serving as an example of an insertion portion, that extend from peripheral direction end portions of facing pin-side wall portions 26A towards a groove-side wall portion 26B side. Note that the reinforcement ribs 72 and the insertion grooves 76 are integrally formed with the guide wall portions 26.

Figure 16B:
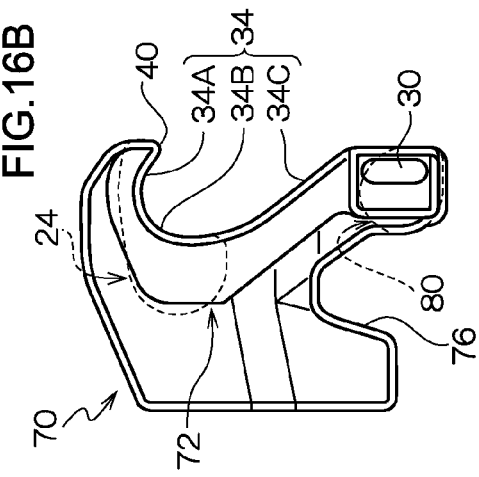
FIG. 16B is a side view of the core member illustrated in FIG. 16A.

As illustrated in FIG. 15 and FIG. 16B, the reinforcement ribs 72 are formed along peripheral outside edge portions of the guide wall portions 26 from wing portions 30 to restriction portions 40 of hooking grooves 34.

As illustrated in FIG. 17 and FIG. 18, in a coupled-together state of adjacent core members 70 wherein a pin portion 80 of a second core member 70 is hooked into the hooking grooves 34 of a first core member 70, at least a portion of the reinforcement rib 72 of the first core member 70 is inserted into the respective insertion groove 76 of the second core member 70.

As illustrated in FIG. 18, the depth of the insertion grooves 76 is set such when coupled-together core members 70 move in a mutually approaching direction, at least a portion of the inserted reinforcement ribs 72 contact the insertion grooves 76 before the pin portion 80 of the second core member 70 passes the restriction portion 40 of the first core member 70 and reaches a position where it is possible to come out of the hooking groove 34.

Figure 16D:
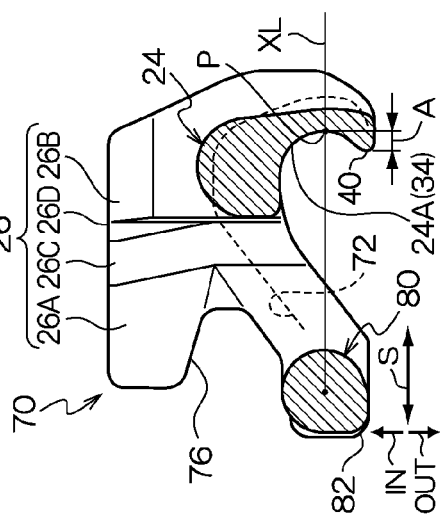
FIG. 16D is a cross-section of the core member illustrated in FIG. 16A, taken along line D-D.
Figure 16A:
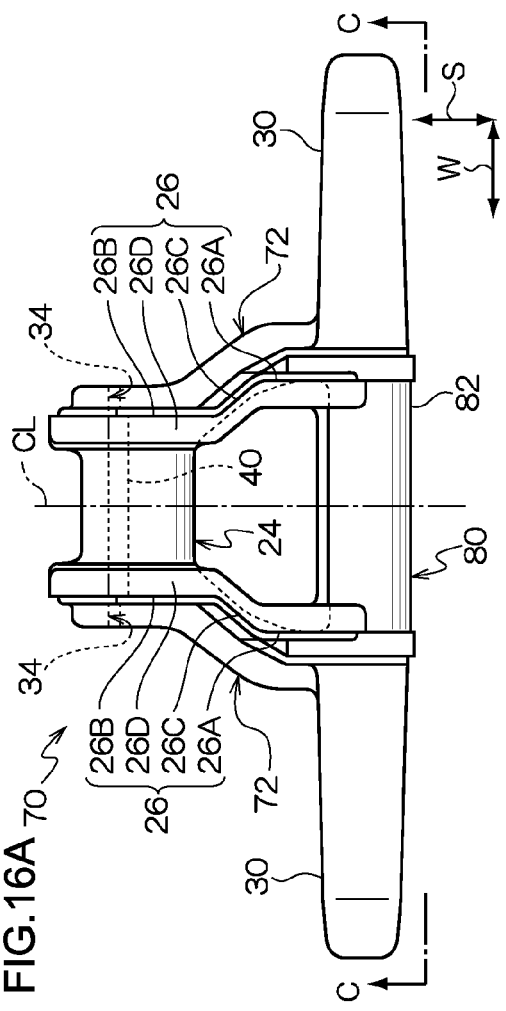
FIG. 16A is a plan view of a core member of the third exemplary embodiment.
Figure 16C:
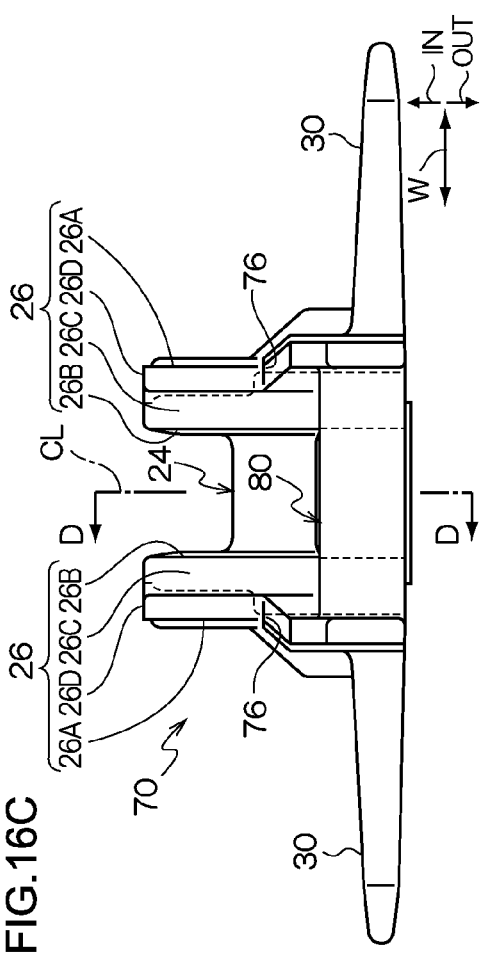
FIG. 16C is a face-on view of the core member illustrated in FIG. 16A, viewed along the direction of the arrow C.

As illustrated in FIG. 16D, the pin portion 80 of the present exemplary embodiment is configured with substantially the same diameter as the pin portion 22 of the first exemplary embodiment, and a protrusion 82 that protrudes in the peripheral direction and extends from a first width direction end to the other width direction end of the pin portion 80 is integrally formed at a portion of the pin portion 80 on the opposite side of the pin portion 80 to the side that makes contact with groove walls 34A of the hooking grooves 34 of the first core member 70 in a coupled-together state of adjacent core members 70. Note that the outer peripheral face of the pin portion 80 is configured as a continuous curved face.

Explanation follows regarding a coupling operation of the core member 70 of the third exemplary embodiment.

First, the positions of an opening of the hooking groove 34 of a first core member 70 and the pin portion 80 of a second core member 70 are positionally aligned with the first core member 70 and the second core member 70 in a tilted state relative to each other, and the pin portion 80 of the second core member 70 is hooked into the hooking groove 34 of the first core member 70.

Next, the angle of relative tilt between the first core member 70 and the second core member 70 is adjusted such that the first core member 70 and the second core member 70 approach a parallel state (for example a state with apex faces 26D of the first core member 70 parallel to the apex faces 26D of the second core member 70 as viewed from the side). When this is performed, at least a portion of the reinforcement ribs 72 of the first core member 70 is inserted into the insertion grooves 76 of the second core member 70. Then tension is applied to the first core member 70 and the second core member 70 in the peripheral direction to achieve a coupled-together state of the first core member 70 and the second core member 70. The first core member 70 and the second core member 70 are coupled together by this coupling operation.

Explanation follows regarding operation and advantageous effects of the core member 70 and a rubber crawler 66 of the third exemplary embodiment.

As explained above, the pin portion 80 includes the protrusion 82 extending from a first width direction end to the other width direction end of the pin portion 80 and protruding in the peripheral direction. The cross-sectional area of the pin portion 80 is accordingly greater than that of the pin portion 22 of the first exemplary embodiment, and deformation of the pin portion 80 due to input from the road surface received by wing portions 30 is effectively suppressed.

When adjacent core members 70 are flexed to bulge towards the peripheral inside due for example to the rubber crawler 66 riding up over a projecting object such as a curb, the outer peripheral face of the protrusion 82 of the pin portion 80 of a second core member 70 contacts groove walls 34C of the hooking grooves 34 of a first core member 70, restricting rotation. Damage, for example, to the core members 70 due to excessive flexing between adjacent core members 70 is accordingly suppressed.

The durability of the guide wall portions 26 to shear force caused by tension acting in the peripheral direction of the coupled core members 70 is increased due to forming the reinforcement ribs 72 to the guide wall portions 26. In particular, the reinforcement ribs 72 effectively exhibit the advantageous effect of enhancing durability when, such as in the guide wall portions 26 of the present exemplary embodiment, the width direction separation differs between the pin-side wall portions 26A and the groove-side wall portions 26B, there is a tendency for stress to be concentrated at coupling wall portions 26C that couple the pin-side wall portions 26A to the groove-side wall portions 26B. Durability can also be increased whilst suppressing an increase in weight in comparison to cases in which durability is increased by simply increasing the overall thickness of the guide wall portions 26.

As illustrated in FIG. 16D, the hooking grooves 34, that receive tension when the crawler is traveling, are reinforced by forming part of the reinforcement ribs 72 along edge portions of the hooking grooves 34. Deformation of the hooking grooves 34 due to tension when the crawler is traveling is accordingly suppressed.

As illustrated in FIG. 18, when coupled-together core members 70 move in a mutually approaching direction, the reinforcement ribs 72 of a first of the core members 70 contact the insertion grooves 76 of a second of the core members 70, restricting the approach of the coupled-together core members 70. Decoupling of the coupled-together core members 70 can accordingly be effectively suppressed.

In the third exemplary embodiment, configuration is made with the reinforcement ribs 72 formed to the width direction outside faces of the guide wall portions 26, however the present invention is not limited to such a configuration and the reinforcement ribs 72 may be formed to width direction inside faces of the guide wall portions 26, or configuration may be made such that the reinforcement ribs 72 are provided to both the width direction inside faces and the width direction outside faces of the guide wall portions 26. The projection amount of the reinforcement ribs 72 may be set appropriately, and configuration may also be made with a reduced projection amount and the insertion grooves 76 omitted.

Note that the core members 20, 50, 70 of the exemplary embodiments described above are integrally formed from a metal material, however there is no limitation thereto and the core members 20, 50, 70 may, for example, be configured as molded resin products as long as sufficient strength and durability are achieved in the crawler belts 13, 48, 68. The core members 20, 50, 70 may also be configured as molded resin products with metal material employed only at locations where strength is required.

Explanation has been given above using examples of exemplary embodiments of the present invention, however these exemplary embodiments are merely examples, and various modifications may be performed within a scope not departing from the spirit of the invention. Obviously the scope of rights of the present invention is not limited by the above exemplary embodiments.

Test Example

The following tests 1, 2 are performed employing a core member according to an Example of the present invention and a core member according to a Comparative Example. Note that the core member of the Example is a core member configured similarly to the core member 70 of the third exemplary embodiment, and the core member of the Comparative Example is configured similarly to the core member 90.

Test 1

In test 1, FEM analysis is performed on the maximum values of stress acting on base portions of the wing portions for a load of 3.5 tonnes applied from above (the inner peripheral face side) to a width direction central portion of the core member in a state wherein leading end sides of the pair of wing portions of the core member are supported from the bottom face side (the outer peripheral face side). Results are illustrated in Table 1.

Test 2

In test 2, FEM analysis is performed on the maximum values of stress acting on the hooking grooves with the core members coupled together, and tension equivalent to 12.6 tonnes applied in the peripheral direction of the core members in the coupled state. Note that the sizes of the pin portions of the core members of the Example and the pin portion of the core member of the Comparative Example are the same. Results are illustrated in Table 1.

TABLE 1

|  | Example | Comparative Example |
| --- | --- | --- |
| Maximum value of stress in FEM analysis of Test 1 (Mpa) | 1555 | 3318 |
| Maximum value of stress in FEM analysis of Test 2 (Mpa) | 1671 | 2364 |

As illustrated in Table 1, the maximum value of stress acting on base portions of the wing portions in the core member of the Example is markedly lower than the maximum value of stress acting on base portions of the wing portions in the core member of the Comparative Example. Namely, it can be seen that stress concentration at base portions of the wing portions is alleviated in the core member of the Example. Accordingly, deformation of the wing portions arising from input from the road surface acting during crawler travel can accordingly be effectively suppressed due to stress concentration at the base portions of the wing portions being alleviated in the core member of the Example wherein the respective wing portions are disposed at width direction outsides at either side of the pin portion.

Moreover, as illustrated in Table 1, in the core member of the Example, the maximum value of stress acting on the hooking grooves is markedly lower than the maximum value of stress acting on the hooking grooves of the core member of the Comparative Example. Namely, it can be seen that stress concentration at the hooking grooves is alleviated in the core member of the Example. Accordingly, deformation of the hooking grooves due to tension acting during crawler travel can accordingly be effectively suppressed due to the concentration of stress in the hooking grooves being alleviated in the core member of the Example wherein reinforcement ribs are provided to the guide wall portions, extending in the peripheral direction and formed with a portion of the reinforcement ribs following the external peripheral shape of the hooking grooves.

The invention claimed is:

1. A crawler core member that configures an endless crawler belt when a plurality of the core members are disposed at uniform intervals along a peripheral direction and are coupled together with the peripheral direction adjacent core members, each of the core members comprising:
    an engagement shaft portion extending in the crawler belt width direction;
    an engagement portion integrally formed to the engagement shaft portion and engaging with an engagement shaft portion of an adjacent of the core members;
    a pair of wing portions integrally formed to the engagement shaft portion and respectively disposed at both width direction sides of the engagement shaft portion, each of the wing portions extending in the width direction; and
    a restriction portion that, in an engaged state of the engagement portion of the core member and the engagement shaft portion of the adjacent core member, restricts movement of the engagement shaft portion towards the peripheral outside,
    wherein the adjacent core members are coupled together by the engagement shaft portion of the adjacent core member moving towards the peripheral inside of the crawler core member and engaging with the engagement portion of the core member, and the core members adjacent to each other are connected by tension in the peripheral direction.

2. The crawler core member of claim 1 wherein the diameter of the engagement shaft portion is a value of 30% of a separation distance between the centers of the engagement shaft portion of the core member and the engagement shaft portion of the adjacent core member in a coupled-together state of the adjacent core members, or a greater value.

3. The crawler core member of claim 1 wherein the engagement portion is a groove that is open towards the peripheral outside of the crawler belt, and a portion of the engagement portion that contacts the engagement shaft portion of the adjacent core member in a coupled-together state of the adjacent core members is shaped so as to follow the outer peripheral face of the engagement shaft portion.

4. The crawler core member of claim 3, wherein the restriction portion is integrally formed to the engagement portion, that projects from an opening side end portion of a groove wall on the opposite side of the engagement portion to the engagement shaft portion side towards the engagement shaft portion side, and in the engaged state of the engagement portion and the engagement shaft portion of the adjacent core member, restricts the movement of the engagement shaft portion towards the peripheral outside by overlapping and contacting the engagement shaft portion.

5. The crawler core member of claim 3 wherein the engagement shaft portion further comprises a protrusion provided to a portion of the engagement shaft portion on the opposite side to a portion of the engagement shaft portion that contacts the engagement portion of the other adjacent core member in a coupled-together state of the adjacent core members, the protrusion projects in the peripheral direction and extends from a first width direction end to the other width direction end of the engagement shaft portion.

6. The crawler core member of claim 1 further comprising a pair of peripheral inside projection portions that are integrally formed to the engagement shaft portion, that are respectively disposed between both end portions of the engagement shaft portion and the pair of wing portions, and that project towards the peripheral inside of the crawler belt and extend along the peripheral direction, with the engagement portion formed to the extended portions of the peripheral inside projection portions, wherein:
    the width of the pair of peripheral inside projection portions is narrower on the engagement portion side than on the engagement shaft portion side; and
    in a coupled-together state of the adjacent core members the engagement portion side of the pair of peripheral inside projection portions of the core member fits inside the engagement shaft portion side of the pair of peripheral inside projection portions of the adjacent core member.

7. The crawler core member of claim 6 wherein the peripheral inside projection portions further comprise reinforcement ribs provided to the width direction inside faces and/or outside faces of the peripheral inside projection portions so as to project out in the width direction and extend along the peripheral direction.

8. The crawler core member of claim 7 wherein a portion of the reinforcement ribs is provided following the outer peripheral shape of the engagement portion.

9. The crawler core member of claim 7 wherein:
    the engagement shaft portion sides of the peripheral inside projection portions comprise insertion portions into which at least a portion of each of the reinforcement ribs provided to the outside faces of the peripheral inside projection portions of the adjacent core member is inserted in a coupled-together state of the adjacent core members, and wherein
    the insertion portions restrict the engagement shaft portion of the core member from moving in a direction to come out of the engagement portion of the adjacent core member by contacting at least a portion of the reinforcement ribs of the adjacent core member.

10. A rubber crawler wherein a rubber resilient body is disposed to the peripheral outside of a crawler belt configured employing a plurality of the crawler core members of claim 1.

11. The crawler core member of claim 1, wherein in a direction orthogonal to a direction of movement when the engagement shaft portion of the adjacent core member is moved toward, and engages with, the engagement portion, an opening width of the engagement portion is larger than a width of the engagement shaft portion of the adjacent core member.

12. The crawler core member of claim 1, wherein the plurality of the core members are provided in a rubber crawler,
    wherein a rubber resilient body is disposed at the peripheral outside of the endless crawler belt, and
    wherein the rubber crawler is not provided with a steel cord.

* * * * *